US010756350B2

(12) United States Patent
Bae et al.

(10) Patent No.: US 10,756,350 B2
(45) Date of Patent: Aug. 25, 2020

(54) BINDER, METHOD OF PREPARING THE BINDER, AND ANODE AND LITHIUM BATTERY INCLUDING THE BINDER

(71) Applicants: SAMSUNG ELECTRONICS CO., LTD., Suwon-si, Gyeonggi-do (KR); Samsung SDI Co., Ltd., Yongin-si, Gyeonggi-do (KR)

(72) Inventors: Woojin Bae, Yongin-si (KR); Seunguk Kwon, Yongin-si (KR); Sangkook Mah, Seoul (KR); Jeeeun Yang, Uiwang-si (KR); Dukhyoung Yoon, Yongin-si (KR); Sungsoo Han, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 322 days.

(21) Appl. No.: 15/656,476

(22) Filed: Jul. 21, 2017

(65) Prior Publication Data
US 2018/0026270 A1     Jan. 25, 2018

(30) Foreign Application Priority Data

Jul. 22, 2016  (KR) ........................ 10-2016-0093461

(51) Int. Cl.
*H01M 4/62* (2006.01)
*H01M 4/60* (2006.01)
*C08G 73/10* (2006.01)
*C08G 81/02* (2006.01)
*C08L 87/00* (2006.01)
*H01M 4/36* (2006.01)
*H01M 4/38* (2006.01)
*H01M 4/587* (2010.01)
*H01M 6/16* (2006.01)
*H01M 10/0568* (2010.01)
*H01M 10/0569* (2010.01)
*H01M 10/0567* (2010.01)

(52) U.S. Cl.
CPC ........ *H01M 4/622* (2013.01); *C08G 73/1042* (2013.01); *C08G 73/1071* (2013.01); *C08G 81/028* (2013.01); *C08L 87/005* (2013.01); *H01M 4/364* (2013.01); *H01M 4/382* (2013.01); *H01M 4/386* (2013.01); *H01M 4/587* (2013.01); *H01M 4/606* (2013.01); *H01M 6/164* (2013.01); *H01M 6/166* (2013.01); *H01M 10/0568* (2013.01); *H01M 10/0569* (2013.01); *C08G 81/027* (2013.01); *C08L 87/00* (2013.01); *H01M 4/366* (2013.01); *H01M 6/168* (2013.01); *H01M 10/0567* (2013.01); *H01M 2300/004* (2013.01)

(58) Field of Classification Search
CPC .. H01M 4/134; H01M 4/621; C08G 73/1071; C08G 73/1042
See application file for complete search history.

(56) References Cited

U.S. PATENT DOCUMENTS

| 4,830,939 | A | * | 5/1989 | Lee | ..................... C08F 299/022 429/312 |
|---|---|---|---|---|---|
| 8,142,927 | B2 | | 3/2012 | Sano et al. | |
| 8,697,282 | B2 | | 4/2014 | Lee et al. | |
| 2005/0153209 | A1 | * | 7/2005 | Vallee | ................. H01M 2/1653 429/314 |
| 2007/0048609 | A1 | | 3/2007 | Ueda et al. | |
| 2012/0153219 | A1 | * | 6/2012 | Zhang | ................... H01M 4/134 252/182.1 |
| 2013/0177807 | A1 | | 7/2013 | Lee et al. | |
| 2014/0011089 | A1 | * | 1/2014 | Yamada | ................. C08G 73/16 429/211 |
| 2017/0155151 | A1 | | 6/2017 | Bae et al. | |

FOREIGN PATENT DOCUMENTS

| EP | 3154110 A1 | 4/2017 |
|---|---|---|
| JP | 5071171 B2 | 8/2012 |
| KR | 100373728 B1 | 2/2003 |
| KR | 1020170061417 A | 6/2017 |
| TW | 20162018 * | 6/2016 |
| WO | 2015186814 A1 | 12/2015 |

OTHER PUBLICATIONS

Donna T. Padavan, et al., "Synthesis, characterization and in vitro cell compatability study of a poly(amic acid) graft/cross-linked poly(vinyl alcohol) hydrogel", Acta Biomaterialia 7 (2011) 258-267.
Extended Search Report issued by the European Patent Office dated Sep. 8, 2017.
Liu Yong, et al., "The Effects of Polyamic Acid on Curing Behavior, Thermal Stability, and Mechanical Properties of Epoxy/DDS System", J. Appl. Polym. Sci. 2013, 3213-3220.

* cited by examiner

Primary Examiner — Gregory Listvoyb
(74) Attorney, Agent, or Firm — Cantor Colburn LLP

(57) ABSTRACT

A binder includes a third polymer including a cross-linked product of a first polymer and a second polymer, wherein the first polymer includes a first functional group and is at least one selected from a polyamic acid and a polyimide, wherein the second polymer includes a second functional group and is water-soluble, and wherein the first polymer and the second polymer are cross-linked by an ester bond formed by a reaction of the first functional group and the second functional.

27 Claims, 6 Drawing Sheets

BINDER, METHOD OF PREPARING THE BINDER, AND ANODE AND LITHIUM BATTERY INCLUDING THE BINDER

CROSS-REFERENCE TO RELATED APPLICATION

This application claims the benefit of and priority to Korean Patent Application No. 10-2016-0093461, filed on Jul. 22, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a binder, a method of preparing the binder, and an electrode and a lithium battery including the binder.

2. Description of the Related Art

In a lithium battery with an electrode including a carbonaceous active material, a water-soluble binder such as styrene-butadiene rubber/carboxymethylcellulose (SBR-CMC) binder provides the mechanical properties and binding strength that is suitable for a battery.

In a lithium battery with an electrode including a metallic active material such as silicon having a large volume change during charging/discharging, a water-soluble binder may not provide suitable mechanical properties or binding strength for a battery.

A polyimide (PI) binder has desirable mechanical properties, chemical resistance, and heat resistance, but is not soluble in water and has a low initial charging/discharging efficiency.

A polyvinyl alcohol (PVA) binder is water-soluble and has desirable initial charging/discharging efficiency and lifespan characteristics but has poor workability in relation to slurry stability and electrode plate uniformity. Also, when the PVA binder is used, cracks may develop in an active material layer and the active material layer may be separated from a current collector, and thus stability of the electrode decreases.

Therefore, there is a need for a binder that reduces and/or suppresses volume change of an electrode in a lithium battery including a metallic active material while also having a desirable initial efficiency, improved lifespan characteristics, and improved electrode stability.

SUMMARY

Provided is a binder that has improved initial capacity, lifespan characteristics, and electrode stability and is capable of suppressing the volume change of an electrode.

Provided is an electrode including the binder.

Provided is a lithium battery including the electrode.

Provided is a method of preparing the binder.

Additional aspects will be set forth in part in the description which follows and, in part, will be apparent from the description, or may be learned by practice of the presented embodiments.

According to an aspect of an embodiment, a binder includes: a third polymer, including a cross-linked product of a first polymer and a second polymer, wherein the first polymer includes a first functional group and is at least one selected from a polyamic acid and a polyimide, wherein the second polymer includes a second functional group and is water-soluble, and wherein the first polymer and the second polymer are cross-linked by an ester bond formed by a reaction of the first functional group and the second functional group.

According to an aspect of another embodiment, an electrode includes: the binder; and a cathode active material or an anode active material.

According to an aspect of still another embodiment, a lithium battery includes: a first electrode including the electrode; a second electrode; and an electrolyte disposed between the first electrode and the second electrode.

According to an aspect of still another embodiment, a method of preparing a binder includes: preparing a third composition by mixing together a first composition including a non-aqueous solvent and a first polymer and a second composition including a second polymer and water, wherein the first polymer includes a first functional group and is selected from at least one of a polyamic acid and a polyimide, and the second polymer includes a second functional group and is water-soluble; and heating the third composition at a temperature of about 160° C. or greater to prepare a third polymer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
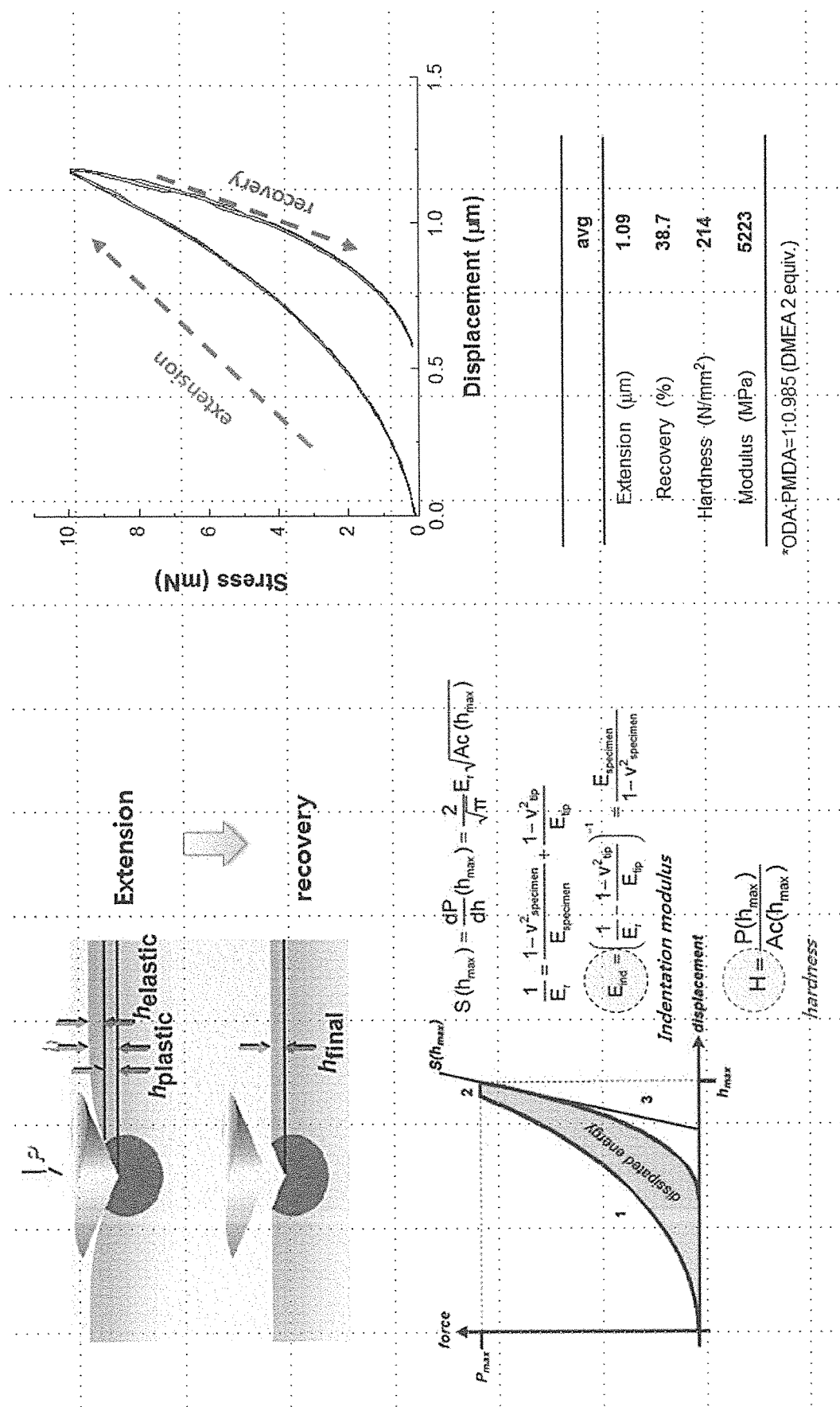
FIG. 1 shows methods and equations that can be used to measure the modulus of the third polymer.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to one or more exemplary embodiments, a binder, an electrode and a lithium battery including the binder, and a method of preparing the binder will be described in detail.

As used herein, the term "cross-link" and/or "cross-linked" denotes a bond that links one polymer chain to another polymer chain. As used herein, a cross-linking group is a covalent bond. As used herein, the term "linker or cross-linker" denotes a functional group that links one polymer chain with another polymer chain. As used herein, the term "cross-linked polymer" denotes a polymer having one polymer chain and another polymer chain that are connected by one or more linking groups. Also, the cross-linked polymer is a product of cross-linking one or more polymers.

According to an embodiment, a binder includes a third polymer, which is a cross-linking, i.e. a cross-linked, product of a first polymer and a second polymer, wherein the first polymer includes a first functional group and is at least one selected from a polyamic acid and a polyimide; and the second polymer that includes a second functional group and is water-soluble, wherein the first polymer and the second polymer are cross-linked when the first functional group and the second functional group react and form an ester bond. The third polymer is a cross-linked polymer of the first polymer and the second polymer. Since the binder includes a third polymer, which is a cross-linked polymer produced by cross-linking the first polymer and the second polymer via an ester bond, excellent electrode stability and suppression of volume expansion derived from a polyimide as well as improved initial charging/discharging efficiency and lifespan characteristics derived from a water-soluble polymer may be simultaneously provided to a lithium battery having an electrode including the binder.

In the binder, the first functional group and the second functional group included in the first polymer and the second polymer may each independently be at least one selected from a carboxyl group, a hydroxyl group, an amide group, and an aldehyde group, but embodiments are not limited thereto, and any suitable material that may form a cross-linking bond including an ester bond by reacting the first functional group and the second functional group may be used. For example, the first functional group may be a carboxyl group (—COOH), and the second functional group may be a hydroxyl group (—OH). When the carboxyl group and the hydroxyl group react, an ester cross-linking bond may be formed. In the first polymer, the first functional group may not be connected to a tetravalent aromatic group that is included in a polyamic acid and a polyimide but may be connected to a side chain of a divalent aromatic group.

In the binder, the first polymer may further include an alkali metal (i.e., an alkali metal ion). The alkali metal may be sodium or lithium. The first polymer may be substituted or doped with an alkali metal. For example, in a polyamic acid, the hydrogen of the carboxyl group connected to the tetravalent aromatic group in the polyamic acid may be substituted with an alkali metal (i.e., an alkali metal cation). For example, a polyimide may be doped with an alkali metal ion and thus may be coordinated to an amide group. When the first polymer includes an alkali metal (pre-lithiation), initial charging/discharging efficiency may improve.

An amount of the alkali metal included in the first polymer may be in a range of about 0.2 equivalents to about 1.0 equivalents at an equivalent ratio with respect to a carboxyl group or an amide group. For example, an amount of the alkali metal included in the first polymer may be in a range of about 0.2 equivalents to about 0.8 equivalents at an equivalent ratio with respect to a carboxyl group or an amide group. For example, an amount of the alkali metal included in the first polymer may be in a range of about 0.3 equivalents to about 0.7 equivalents at an equivalent ratio with respect to a carboxyl group or an amide group. For example, an amount of the alkali metal included in the first polymer may be in a range of about 0.4 equivalents to about 0.6 equivalents at an equivalent ratio with respect to a carboxyl group or an amide group. For example, an amount of the alkali metal included in the first polymer may be in a range of about 0.45 equivalents to about 0.55 equivalents at an equivalent ratio with respect to a carboxyl group or an amide group. When an amount of the alkali metal is within these ranges, the physical properties of a binder may further improve.

When an amount of lithium of in polyamic acid, that is, a substitution degree of lithium ions, is lower than 0.2 equivalents at an equivalent ratio with respect to a carboxyl group, a ratio of prelithiation is low, and thus an effect on suppressing an irreversible lithiation reaction at the first cycle may be minimal. Also, when an amount of lithium in the polyamic acid, or a substitution degree of lithium ions, is greater than 1.0 equivalents at an equivalent ratio with respect to a carboxyl group, an imidification ratio may significantly decrease, which may decrease lifespan characteristics. To obtain the amount of lithium in the polyamic acid, or a substitution degree of lithium ions, within these ranges, an amount of LiOH that is used to lithiate the polyamic acid may be in a range of about 0.2 equivalents to about 1.0 equivalents at an equivalent ratio with respect to a carboxyl group of the polyamic acid.

For example, the polyamic acid may be represented by Formula 1 or Formula 2:

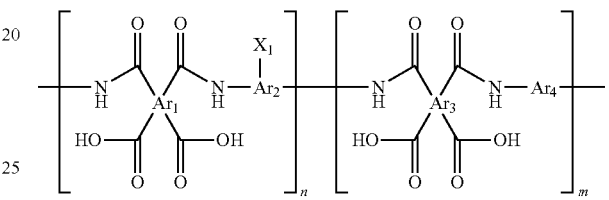

Formula 1

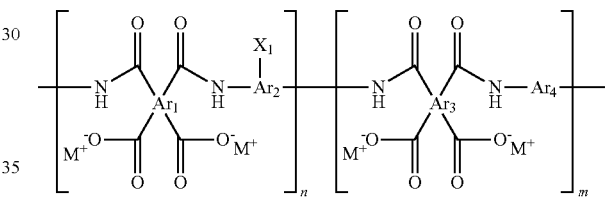

Formula 2

In Formulae 1 and 2, M is an alkali metal; $Ar_1$ and $Ar_3$ are each independently an aromatic group that is selected from a substituted or unsubstituted tetravalent C6-C24 arylene group and a substituted or unsubstituted tetravalent C4-C24 heteroarylene group, wherein the aromatic group is one aromatic ring, a ring including at least two aromatic rings fused to each other, or a ring including at least two aromatic rings that are linked by a single bond, —O—, —S—, —C(=O)—, —S(=O)$_2$—, —Si(Ra)(Rb)— (where Ra and Rb are each independently a substituted or unsubstituted C1-C10 alkyl group), a C1-C10 alkylene group substituted or unsubstituted with a halogen, or —C(=O)—NH—; $Ar_2$ and $Ar_4$ are each independently an aromatic group that is selected from a substituted or unsubstituted divalent C6-C24 arylene group and a substituted or unsubstituted divalent C4-C24 heteroarylene group, wherein the aromatic ring is one aromatic ring, a ring including at least two aromatic rings fused to each other, or a ring including at least two aromatic rings that are linked by a single bond, —O—, —S—, —C(=O)—, —S(=O)$_2$—, —Si(Ra)(Rb)— (where Ra and Rb are each independently a substituted or unsubstituted C1-C10 alkyl group), a C1-C10 alkylene group substituted or unsubstituted with a halogen, or —C(=O)—NH—; $X_1$ is —C(=O)OH, —OH, —C(=)—NH$_2$, or —C(=O)H; and n and m are each a molar ratio of a repeating unit, where 0<n<1, 0<m<1, and n+m=1.

For example, the polyamic acid may be represented by Formula 3 or Formula 4:

Formula 3

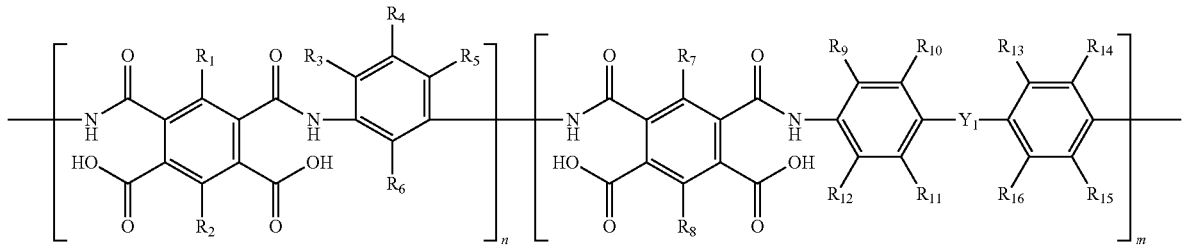

Formula 4

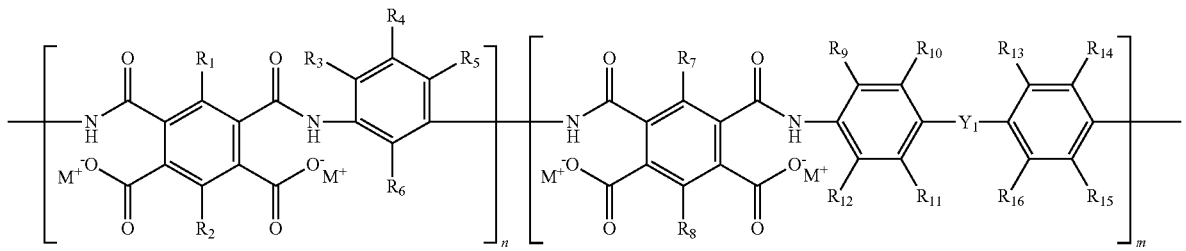

In Formulae 3 and 4, M is lithium or sodium; $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ are each independently a hydrogen, a halogen, —C(=O)OH, —OH, —C(=O)—NH$_2$, —C(=O)H, a C1-C10 alkyl group substituted or unsubstituted with a halogen, a C6-C20 aryl group substituted or unsubstituted with a halogen, or a C2-C20 heteroaryl group substituted or unsubstituted with a halogen; $Y_1$ is a single bond, —O—, —S—, —C(=O)—, —S(=O)$_2$—, —Si(Ra)(Rb)— (where Ra and Rb are each independently a substituted or unsubstituted C1-C10 alkyl group), a C1-C10 alkylene group substituted or unsubstituted with a halogen, or —C(=O)—NH—, wherein R is a C1-C10 alkyl group; at least one selected from $R_3$, $R_4$, $R_5$, and $R_6$ is —C(=OO)OH, —OH, —C(=O)—NH$_2$, or —C(=O)H; and n and m are each a molar ratio of a repeating unit, where 0<n<1, 0<m<1, and n+m=1.

For example, the polyimide may be represented by Formula 5 or Formula 6:

Formula 5

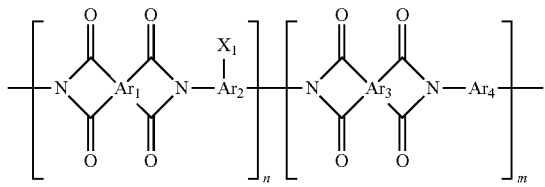

Formula 6

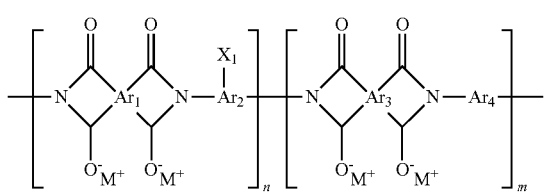

In Formulae 5 and 6, M is an alkali metal; $Ar_1$ and $Ar_3$ are each independently an aromatic group that is selected from a substituted or unsubstituted tetravalent C6-C24 arylene group and a substituted or unsubstituted tetravalent C4-C24 heteroarylene group, wherein the aromatic group is one aromatic ring, a ring including at least two aromatic rings fused to each other, or a ring including at least two aromatic rings that are linked by a single bond, —O—, —S—, —C(=O)—, —S(=O)$_2$—, —Si(Ra)(Rb)— (where Ra and Rb are each independently a substituted or unsubstituted C1-C10 alkyl group), a C1-C10 alkylene group substituted or unsubstituted with a halogen, or —C(=O)—NH—O; $Ar_2$ and $Ar_4$ are each independently an aromatic group that is selected from a substituted or unsubstituted divalent C6-C24 arylene group and a substituted or unsubstituted divalent C4-C24 heteroarylene group, wherein the aromatic group is one aromatic ring, a ring including at least two aromatic rings fused to each other, or a ring including at least two aromatic rings that are linked by a single bond, —O—, —S—, —C(=O)—, —S(=O)$_2$—, —Si(Ra)(Rb)— (where Ra and Rb are each independently a substituted or unsubstituted C1-C10 alkyl group), a C1-C10 alkylene group substituted or unsubstituted with a halogen, or —C(=O)—NH—; $X_1$ is —C(=O)OH, —OH, —CO—NH$_2$, or —C(=O)H; and n and m are each a molar ratio of a repeating unit, where 0<n<1, 0<m<1, and n+m=1.

For example, the polyimide may be represented by Formula 7 or Formula 8:

Formula 7

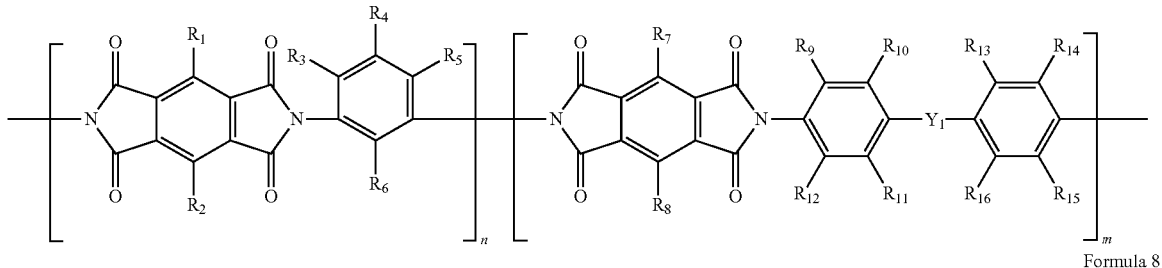

Formula 8

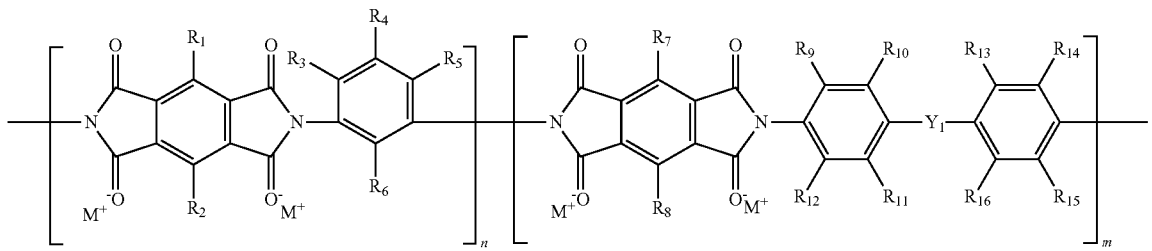

In Formulae 7 and 8, M is lithium or sodium; $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ are each independently a hydrogen, a halogen, —C(=O)OH, —OH, —C(=O)—NH$_2$, —C(=O)H, a C1-C10 alkyl group substituted or unsubstituted with a halogen, a C6-C20 aryl group substituted or unsubstituted with a halogen, or a C2-C20 heteroaryl group substituted or unsubstituted with a halogen; $Y_1$ is a single bond, —O—, —S—, —C(=O)—, —S(=O)$_2$—, —Si(Ra)(Rb)— (where Ra and Rb are each independently a substituted or unsubstituted C1-C10 alkyl group), a C1-C10 alkylene group substituted or unsubstituted with a halogen, or —C(=O)—NH—; at least one selected from $R_3$, $R_4$, $R_5$, and $R_6$ is —C(=O)OH, —OH, —C(=O)—NH$_2$, or —C(=O)H; and n and m are each a molar ratio of a repeating unit, where 0<n<1, 0<m<1, and n+m=1.

For example, in the binder, the polyamic acid may be represented by Formula 9 or Formula 10, and the polyimide may be represented by Formula 11 or Formula 12:

Formula 9

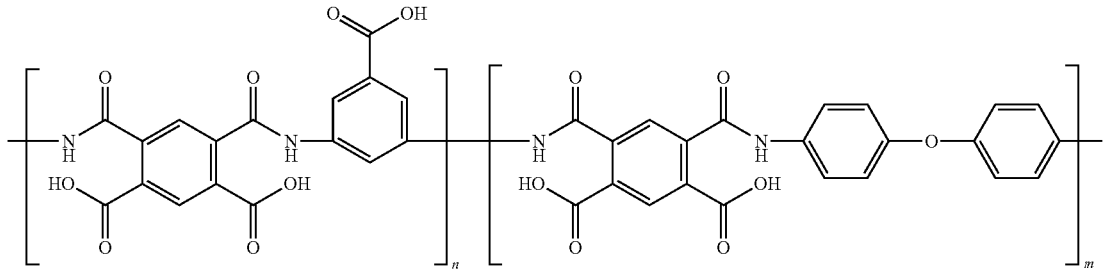

Formula 10

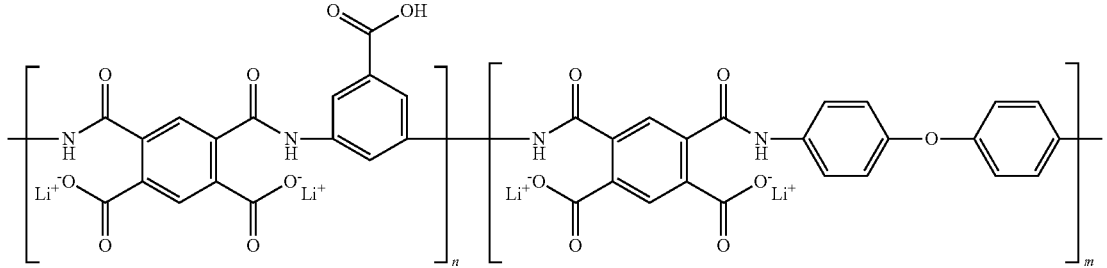

Formula 11

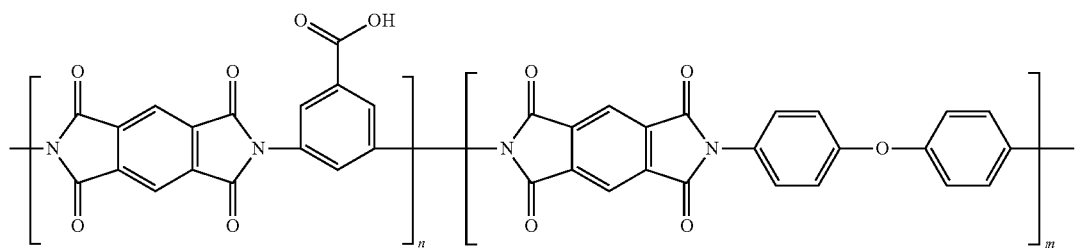

Formula 12

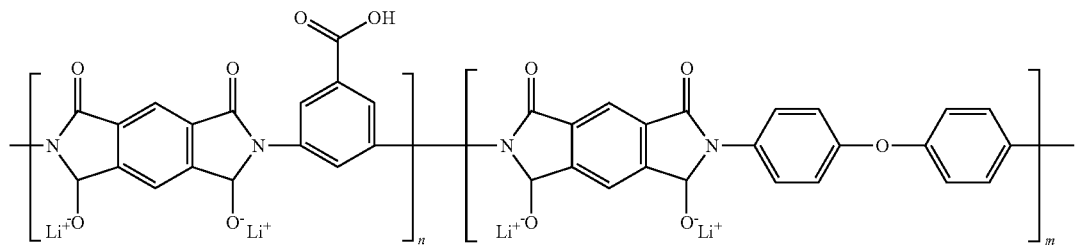

In Formulae 9 to 11, n and m are each a molar ratio of a repeating unit, where 0<n<1, 0<m<1, and n+m=1.

For example, in the first polymer represented by one of Formulae 1 to 12, the molar ratios, n and m, of a repeating unit including a cross-linking group and a repeating unit not including a cross-linking group may satisfy 0<n<0.5, 0.5<m<1, and n+m=1. For example, in the first polymer represented by one of Formulae 1 to 12, the molar ratios, m and n, of a repeating unit including a cross-linking group and a repeating unit not including a cross-linking group may satisfy 0.1<n<0.4, 0.6<m<0.9, and n+m=1. For example, in the first polymer represented by one of Formulae 1 to 12, the molar ratios, m and n, of a repeating unit including a cross-linking group and a repeating unit not including a cross-linking group may satisfy 0.15<n<0.35, 0.65<m<0.85, and n+m=1. For example, in the first polymer represented by one of Formulae 1 to 12, the molar ratios, m and n, of a repeating unit including a cross-linking group and a repeating unit not including a cross-linking group may satisfy 0.2<n<0.3, 0.7<m<0.8, and n+m=1. When the molar ratios are within these ranges, a binder may provide improved physical properties.

For example, the first polymer represented by one of Formulae 1 to 12 may be a random copolymer, for example a random block copolymer. For example, the first polymer represented by one of Formulae 1 to 12 may be a block copolymer.

A weight average molecular weight of the first polymer may be in a range of about 10,000 to about 1,200,000 Daltons (Da). For example, a weight average molecular weight of the first polymer may be in a range of about 10,000 to about 1,100,000 Da. For example, a weight average molecular weight of the first polymer may be in a range of about 10,000 to about 1,000,000 Da. For example, a weight average molecular weight of the first polymer may be in a range of about 10,000 to about 500,000 Da. For example, a weight average molecular weight of the first polymer may be in a range of about 100,000 to about 500,000 Da. For example, a weight average molecular weight of the first polymer may be in a range of about 100,000 to about 400,000 Da. For example, a weight average molecular weight of the first polymer may be in a range of about 100,000 to about 300,000 Da. When the weight average molecular weight of the first polymer is within these ranges, physical properties of the binder may improve.

In the binder, the second polymer may be a polymerization reaction product, or its hydrolysate, of at least one monomer selected from a vinyl-based monomer, an acetate-based monomer, an alcohol-based monomer, a (meth)acryl-based monomer, an acrylamide-based monomer, and a methacrylamide-based monomer.

For example, the second polymer may be a polymerization reaction product, or its hydrolysate, of at least one monomer selected from vinyl acetate, vinyl alcohol, butyl (meth)acrylate, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, 2-hydroxypropyleneglycol (meth)acrylate, acrylic acid, methacrylic acid, 2-(meth)acryloyloxy acetic acid, 3-(meth)acryloyloxy propyl acid, 4-(meth)acryloyloxy butyric acid, itaconic acid, maleic acid, 2-isocyanatoethyl (meth)acrylate, 3-isocyanatopropyl (meth)acrylate, 4-isocyanatobutyl (meth)acrylate, (meth)acrylamide, ethylene di(meth)acrylate, diethyleneglycol (meth)acrylate, triethyleneglycol di(meth)acrylate, trimethylenepropane tri(meth)acrylate, trimethylenepropanetriacrylate, 1,3-butanediol (meth)acrylate, 1,6-hexanediol di(meth)acrylate, allyl acrylate, and N-vinyl caprolactam.

In particular, the second polymer may be a polyvinyl alcohol (PVA). For example, polyvinyl alcohol may be a hydrolysate obtained by hydrolyzing polyvinyl acetate with a base such as potassium hydroxide.

A saponification degree of the polyvinyl alcohol may be in a range of about 60% to about 99%. For example, a saponification degree of the polyvinyl alcohol may be in a range of about 70% to about 95%. For example, a saponification degree of the polyvinyl alcohol may be in a range of about 75% to about 90%. For example, a saponification degree of the polyvinyl alcohol may be in a range of about 80% to about 90%. For example, a saponification degree of the polyvinyl alcohol may be in a range of about 85% to about 90%. When the saponification degree of the polyvinyl alcohol is within these ranges, the binder may provide improved physical properties.

A weight average molecular weight of the polyvinyl alcohol may be in a range of about 10,000 to about 500,000 Da. For example, a weight average molecular weight of the polyvinyl alcohol may be in a range of about 10,000 to about 450,000 Da. For example, a weight average molecular weight of the polyvinyl alcohol may be in a range of about 10,000 to about 400,000 Da. For example, a weight average molecular weight of the polyvinyl alcohol may be in a range of about 10,000 to about 300,000 Da. For example, a weight average molecular weight of the polyvinyl alcohol may be in a range of about 10,000 to about 200,000 Da. For example, a weight average molecular weight of the polyvinyl alcohol may be in a range of about 50,000 to about 150,000 Da. For example, a weight average molecular weight of the polyvinyl alcohol may be in a range of about 70,000 to about 100,000 Da. For example, a weight average molecular weight of the polyvinyl alcohol may be in a range of about 80,000 to about 100,000 Da. When the weight average molecular weight of the polyvinyl alcohol is within these ranges, the physical properties of the binder may improve.

In the binder, a weight ratio of the first polymer and the second polymer included in the third polymer may be in a range of about 1:99 to about 50:50. For example, in the binder, a weight ratio of the first polymer and the second polymer included in the third polymer may be in a range of about 5:95 to about 45:55. For example, in the binder, a weight ratio of the first polymer and the second polymer included in the third polymer may be in a range of about 5:95 to about 40:60. For example, in the binder, a weight ratio of the first polymer and the second polymer included in the third polymer may be in a range of about 5:95 to about 35:65. For example, in the binder, a weight ratio of the first polymer and the second polymer included in the third polymer may be in a range of about 10:90 to about 30:70. When the weight ratio of the first polymer to the second polymer is within these ranges, the physical properties of the binder may improve.

In the binder, the cross-linking reaction may be at a temperature of about 160° C. or greater. For example, the cross-linking reaction may be performed by heat-treating a composition including the first polymer and the second polymer at a temperature of about 160° C. or greater. For example, the cross-linking reaction may be performed by heat-treating a composition including the first polymer and the second polymer at a temperature of about 165° C. or greater. For example, the cross-linking reaction may be performed by heat-treating a composition including the first polymer and the second polymer at a temperature of about 170° C. or greater. For example, the cross-linking reaction may be performed by heat-treating a composition including the first polymer and the second polymer at a temperature of about 175° C. or greater. When the cross-linking reaction is performed within these temperature ranges, a cross-linked polymer may be produced. When the cross-linking reaction is performed at a temperature lower than about 160° C., a cross-linked polymer may not be obtained. When the cross-linking reaction of the binder is performed at a temperature of about 160° C. or greater, the cross-linking reaction may be a catalyst-free reaction. When a catalyst such as an acid is additionally included in the cross-linking reaction, a suitable temperature for the cross-linking reaction to occur may be lowered from about 160° C. to about 120° C. Also, when a separate cross-linking agent is used, a suitable temperature for the cross-linking reaction to occur may be about 120° C. or lower.

Also, when the cross-linking reaction of the binder is performed at a temperature of about 160° C. or greater, the polyamic acid may be cured to obtain a polyimide. For example, the polyamic acid may provide an imidification ratio of about 60% or greater at a cross-linking reaction temperature of about 160° C. or greater. For example, the polyamic acid may provide an imidification ratio of about 70% or greater at a cross-linking reaction temperature of about 160° C. or greater. For example, the polyamic acid may provide an imidification ratio of about 80% or greater at a cross-linking reaction temperature of about 160° C. or greater. For example, the polyamic acid may provide an imidification ratio of about 90% or greater at a cross-linking reaction temperature of about 160° C. or greater. An imidification ratio of the polyamic acid may be calculated by using proton nuclear magnetic resonance ($^1$H-NMR). In the binder, when the polyamic acid is cured into polyimide, the mechanical properties of the binder may be improved.

In one embodiment, an acid equivalent of the polyamic acid may be less than about 300 grams per equivalent (g/eq). For example, an acid equivalent of the polyamic acid may be in a range of about 50 g/eq to about 250 g/eq. When an acid equivalent of the polyamic acid is less than about 300 g/eq, an amount of carboxyl group (—C(=O)OH) and/or carboxylate group (—C(=O)O—) per unit weight may increase. In a case where an amount of carboxyl group and/or carboxylate per unit weight increases, for example, when a silicon-based anode active material is used as an anode material, an interaction between the binder and the silicon-based anode active material having a hydroxyl group on a surface thereof may increase, and thus a binding strength of the binder with the anode active material may improve. When an acid equivalent is about 300 g/ep or greater, an initial efficiency and lifespan characteristics of a lithium battery may deteriorate.

In the binder, a modulus of the third polymer may be greater than each of a modulus of the first polymer and a modulus of the second polymer. Since the third polymer is a cross-linked polymer formed by cross-linking the first polymer and the second polymer, the modulus of the third polymer may be increased, and thus stiffness of the third polymer may increase. For example, a modulus of the third polymer may be about 30 GPa or greater. For example, a modulus of the third polymer may be about 35 GPa or greater. For example, a modulus of the third polymer may be about 38 GPa or greater. A modulus of the third polymer may be an indentation modulus. A modulus of the third polymer can be measured with a microindenter by applying 10 mN on the third polymer, measuring displacement, and using equations as shown in FIG. 1.

In the binder, an indentation hardness of the third polymer may be greater than each of an indentation hardness of the first polymer and an indentation hardness of the second polymer. For example, since the third polymer is a cross-linked polymer that is formed by cross-linking the first polymer and the second polymer, indentation hardness of the third polymer may be increased. For example, an indentation hardness of the third polymer may be about 1630 Newtons per square millimeter (N/mm$^2$) or greater. For example, an indentation hardness of the third polymer may be about 1700 N/mm$^2$ or greater. For example, an indentation hardness of the third polymer may be about 1800 N/mm$^2$ or greater. For example, an indentation hardness of the third polymer may be about 1900 N/mm$^2$ or greater. For example, an indentation hardness of the third polymer may be about 2000 N/mm$^2$ or greater. For example, an indentation hardness of the third polymer may be about 2100 N/mm$^2$ or greater. For example, an indentation hardness of the third polymer may be about 2200 N/mm² or greater. An indentation hardness of the third polymer can be measured with a microindenter by applying 10 mN on the third polymer, measuring displacement, and using equations as shown FIG. 1.

In the binder, the third polymer, which is a cross-linked polymer, may have a 3-dimensional network structure including a plurality of first polymer chains and a plurality of second polymer chains that are cross-linked by a linker or a cross-linker. When the third polymer has this network structure, the volume change during charging/discharging of an electrode including the binder may be reduced, for example suppressed.

In the binder, a weight average molecular weight of the third polymer may be in a range of about 10,000 to about 1,500,000 Da. For example, in the binder, a weight average molecular weight of the third polymer may be in a range of about 10,000 to about 1,200,000 Da. For example, in the binder, a weight average molecular weight of the third polymer may be in a range of about 10,000 to about 1,100,000 Da. For example, in the binder, a weight average molecular weight of the third polymer may be in a range of about 10,000 to about 1,000,000 Da. For example, in the binder, a weight average molecular weight of the third polymer may be in a range of about 10,000 to about 500,000 Da. For example, in the binder, a weight average molecular weight of the third polymer may be in a range of about 100,000 to about 500,000 Da. For example, in the binder, a weight average molecular weight of the third polymer may be in a range of about 100,000 to about 400,000 Da. For example, in the binder, a weight average molecular weight of the third polymer may be in a range of about 100,000 to about 300,000 Da. When the weight average molecular weight of the third polymer is within these ranges, the physical properties of the binder may improve.

For example, in the binder, the third polymer may be represented by at least one selected from Formulae 13 to 16:

Formula 13

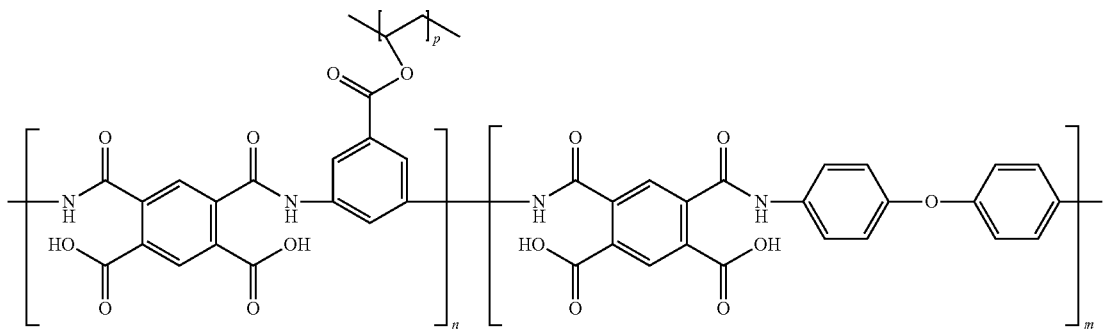

Formula 14

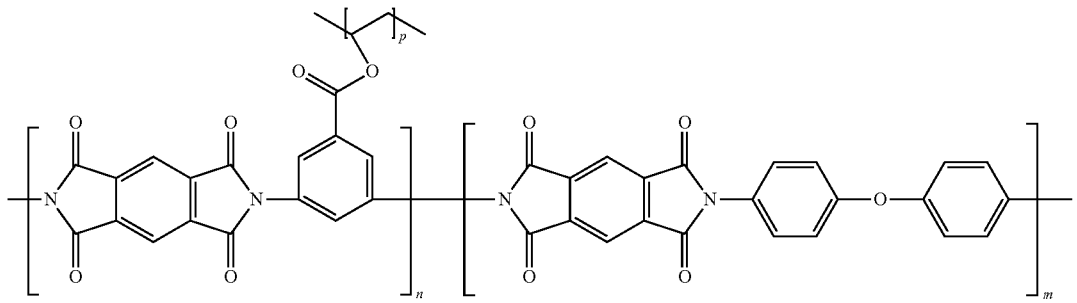

Formula 15

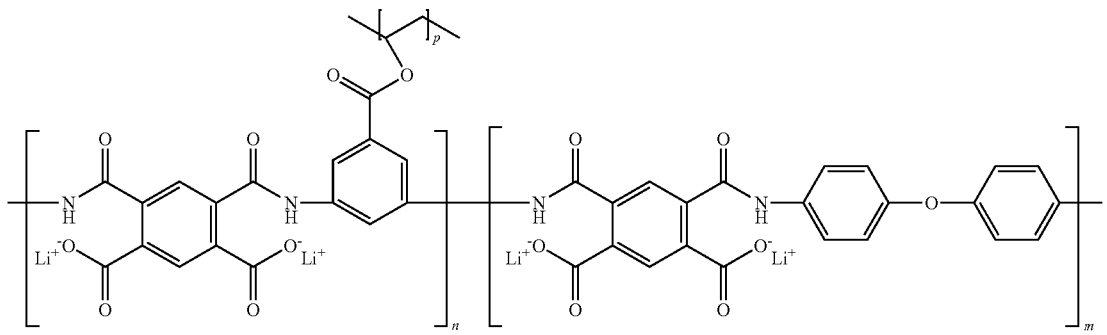

Formula 16

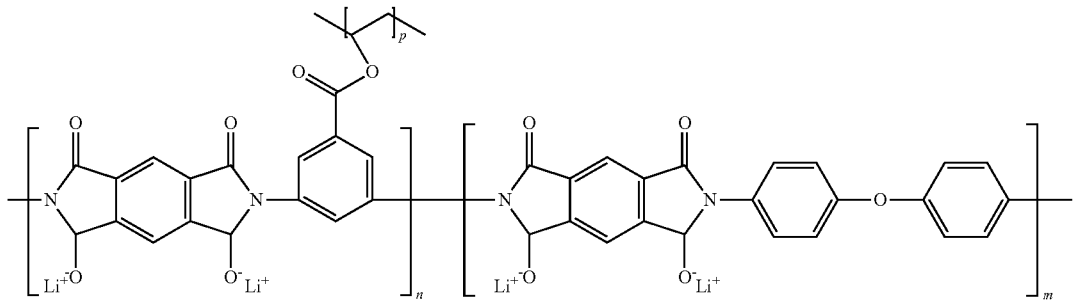

In Formulae 13 to 16, n and m are each a molar ratio of a repeating unit, where $0<n<1$, $0<m<1$, and $n+m=1$; and p is a polymerization degree which is in a range of about 250 to about 12,500.

The binder may further include a fourth polymer that is water-soluble and selected from hydroxyethyl cellulose ether, dextran, carboxymethylcellulose (CMC), alginate, cellulose nanofiber, xanthan gum, and guar gum. When the binder further includes the fourth polymer, the physical properties of the binder may be further controlled.

Although a use of the binder is not limited, the binder, for example, may be used in an electrochemical battery. A type of the electrochemical battery is not limited to a device that may store energy through an electrochemical reaction, and examples of the device may include a primary battery and a secondary battery. Examples of the electrochemical battery may include an alkali metal battery such as a lithium battery or a sodium battery, an alkaline-earth metal battery such as a magnesium battery, a metal air battery, a super capacitor, or a fuel battery.

According to another embodiment, an electrode includes the binder; and a cathode active material or an anode active material. For example, the electrode may be a cathode that includes a binder and a cathode active material. For example, the electrode may be an anode that includes a binder and an anode active material.

For example, the electrode may be an anode that includes a metallic anode active material.

For example, the metallic anode active material may be at least one selected from a lithium metal; a lithium-alloyable metal; a composite of a lithium-alloyable metal and carbon; a composite of a lithium-alloyable metal and nitrogen; a composite of a lithium-alloyable metal, nitrogen, and carbon; a composite of a lithium-alloyable metal and a metal that is inert to lithium; a composite of a lithium-alloyable metal and a metal oxide that is inert to lithium; a composite of a lithium-alloyable metal and a metal nitride that is inert to lithium; and a composite of a lithium-alloyable metal and a metal nitrate that is inert to lithium. For example, the metallic anode active material may include at least one selected from a silicon-based active material, a tin-based active material, a silicon-tin alloy-based active material, and a silicon-carbonaceous (silicon-carbon) active material.

Examples of the lithium-alloyable metal are Si, Sn, Al, Ge, Pb, Bi, Sb, a Si—X alloy (where X is an alkali metal, an alkali earth metal, a Group XIII element, a Group XIV element, a transition metal, a rare earth element, or a combination thereof, and X is not Si), and a Sn—X' alloy (where X' is an alkali metal, an alkali earth metal, a Group XIII element, a Group XIV element, a transition metal, a rare earth element, or a combination thereof, and X' is not Sn). In some embodiments, X and/or X' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

For example, the composite of a lithium-alloyable metal and carbon may be an alloy or a composite that is represented by Formula $Si_xSn_qM_yC_z$ (where q, x, y, and z denote atom percent values, (a) $(q+x)>2y+z$; (b) x, y and z are each independently greater than 0; (c) q is 0 or greater; (d) M is at least one metal selected from manganese, molybdenum, niobium, tungsten, tantalum, iron, copper, titanium, vanadium, chrome, nickel, cobalt, zirconium, yttrium, or a combination thereof).

For example, the composite of a lithium-alloyable metal and a metal that is inert to lithium may be an alloy or a composite that is represented by Formula $Si_xM_yAl_z$ (where x, y, and z denote atom percent values, (a) $x+y+z=100$, (b) $x\geq55$, (c) $y<22$, (d) $z>0$, (e) M is at least one metal selected from manganese, molybdenum, niobium, tungsten, tantalum, iron, copper, titanium, vanadium, chrome, nickel, cobalt, zirconium, yttrium, or a combination thereof). The oxidation state of a metal that is inert to lithium includes any suitable oxidation state of the metal that is inert, i.e. non-reactive, towards lithium metal.

The anode may further include as an anode active material at least one selected from a transition metal oxide, a non-transition metal oxide, and a carbonaceous material.

Examples of the transition metal oxide include a lithium titanium oxide, a vanadium oxide, and a lithium vanadium oxide. Examples of the non-transition metal oxide include $SnO_2$ and $SiO_x$ (where $0<x<2$). Examples of the carbonaceous material are crystalline carbon, amorphous carbon, and combinations thereof. An example of the crystalline carbon is graphite, such as natural graphite or artificial graphite, in shapeless, plate, flake, spherical, or fibrous form. Examples of the amorphous carbon are soft carbon (carbon sintered at low temperatures), hard carbon, meso-phase pitch carbides, and sintered cokes.

In the electrode, a thickness expansion ratio of the electrode defined according to Equation 1 may be less than about 54%. For example, the electrode may be an anode.

Thickness expansion ratio (%)=[Electrode thickness of disassembled battery after $2^{nd}$ charging cycle/ Electrode thickness of battery before assembling]×100   Equation 1

For example, a thickness expansion ratio of the anode may be about 52% or less. For example, a thickness expansion ratio of the anode may be about 50% or less. For example, a thickness expansion ratio of the anode may be about 48% or less. For example, a thickness expansion ratio of the anode may be about 46% or less. For example, a thickness expansion ratio of the anode may be about 44% or less. For example, a thickness expansion ratio of the anode may be about 42% or less. When the binder includes the cross-linked polymer having an increased modulus, binding strength of the binder increases, which may suppress volume change of the anode including the binder during charging/discharging. The charging/discharging conditions may refer to Evaluation Example 7.

For example, the anode is prepared as follows. For example, an anode active material, a conducting agent, the cross-linked polymer binder, and a solvent are combined to prepare an anode active material composition. In some embodiments, the anode active material composition may be directly coated on a current collector such as copper foil to prepare an anode plate. In some embodiments, the anode active material composition may be cast on a separate support to form an anode active material film, which may then be separated from the support and laminated on a copper current collector to prepare an anode plate.

Alternatively, an anode may be prepared as follows. For example, an anode active material composition including an anode active material, a conducting agent, a solvent, the first polymer, and the second polymer may be prepared, and the anode active material composition may then be coated on a current collector and cross-linking polymerization performed thereon by heat-treating the current collector at a temperature of about 160° C. or greater to prepare an anode including a binder that includes a cross-linked polymer (the third polymer). Alternatively, the anode active material composition may be cast on a separate support and cross-linking polymerization performed thereon by heat-treating the current collector at a temperature of about 160° C. or greater to prepare an anode active material film including a binder that includes a cross-linked polymer, and the anode active material film separated from the support may be laminated on a copper current collector to prepare an anode plate. The anode is not limited to the examples described above, and may be one of a variety of types.

Examples of the conducting agent may include natural graphite, artificial graphite, carbon black, acetylene black, or Ketjen black; carbon fibers; or a metal powder or metal fibers of copper, nickel, aluminum, or silver. Also, a conducting material such as a polyphenylene derivative or a combination including a conducting material may be used, but examples of the conducting material are not limited thereto, and any material available as a conducting material in the art may be used. Also, a crystalline material may be added as a conducting material.

The binder may further include a vinylidene fluoride/hexafluoropropylene copolymer, polyvinylidene fluoride (PVDF), polyacrylonitrile, polymethyl methacrylate, polytetrafluoroethylene (PTFE), a styrene-butadiene rubber polymer, or combinations thereof, in addition to the cross-linked polymer, but embodiments are not limited thereto, and any suitable material available as a binder, in the art, may be additionally used.

Examples of the solvent may include N-methylpyrrolidone, acetone, or water, but embodiments are not limited thereto, and any suitable material available as a solvent, including those in the art, may be used.

The amounts of the anode active material, the conducting agent, the binder, and the solvent may be in ranges that are suitable for use in lithium batteries. At least one of the conducting agent, the binder, and the solvent may be omitted according to a use and a structure of the lithium battery.

The cathode may be prepared in the same manner as the anode, except that a cathode active material is used instead of an anode active material. Also, the same conducting agent, binder, and solvent used in the preparation of the anode may be used in the preparation of a cathode active material composition.

For example, a cathode active material, a conducting agent, a binder, and a solvent may be combined, for instance mixed together, to prepare a cathode active material composition. The cathode active material composition may be directly coated on an aluminum current collector to prepare a cathode plate. In some embodiments, the cathode active material composition may be cast on a separate support to form a cathode active material film, which may then be separated from the support and laminated on an aluminum current collector to prepare a cathode plate.

Alternatively, a cathode may be prepared as follows. A cathode active material composition including a cathode active material, a conducting agent, a binder, a solvent, the first polymer and the second polymer may be prepared, and the cathode active material composition may then be coated on a current collector and cross-linking polymerization performed thereon by heat-treating the current collector at a temperature of about 160° C. or greater to prepare an anode including a binder that includes a cross-linked polymer (the third polymer). Alternatively, the cathode active material composition may be cast on a separate support and cross-linking polymerization performed thereon by heat-treating the current collector at a temperature of about 160° C. or greater to prepare a cathode active material film including a binder that includes a cross-linked polymer, and the cathode active material film separated from the support may be laminated on a copper current collector to prepare a cathode plate. The cathode is not limited to the examples described above, and may be one of a variety of suitable types.

The cathode active material may include at least one selected from a lithium cobalt oxide, a lithium nickel cobalt manganese oxide, a lithium nickel cobalt aluminum oxide, a lithium iron phosphate, and a lithium manganese oxide, but embodiments are not limited thereto, and any suitable material available as a cathode active material, including those in the art, may be used.

For example, the cathode active material may be a compound represented by one of the following formulae: $Li_aA_{1-b}B'_bD_2$ (where $0.90 \leq a \leq 1.8$ and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha \leq 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_b Co_cMn_dGeO_2$ (where $0.90 \leq a \leq 1.8$, $0 \leq b \leq 0.9$, $0 \leq c \leq 0.5$, $0 \leq d \leq 50.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof The compounds listed above as cathode active materials may have a surface coating layer (hereinafter, also referred to as "coating layer"). Alternatively, a combination of a compound without a coating layer and a compound having a coating layer, the compounds being selected from the compounds listed above, may be used. In some embodiments, the coating layer may include at least one compound of a coating element selected from an oxide, a hydroxide, an oxyhydroxide, an oxycarbonate, and a hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In some embodiments, the coating layer may be formed using any suitable method that does not adversely affect the physical properties of the cathode active material when a compound of the coating element is used. For example, the coating layer may be formed using a spray coating method or a dipping method. The suitable coating methods may be well understood, including by one of ordinary skill in the art, and thus a detailed description thereof will be omitted.

In some embodiments, the cathode active material may be $LiCoO_2$, $LiMn_xO_{2x}$ (where x=1 or 2), $LiNi_{1-x}Mn_xO_{2x}$ (where $0<x<1$), $LiNi_{1-x-y}Co_xMn_yO_2$ (where $0 \leq x \leq 0.5$ and $0 \leq y \leq 0.5$), or $LiFePO_4$.

According to another embodiment, a lithium battery includes the first electrode; a second electrode; and an electrolyte between the first electrode and the second electrode. For example, a first electrode may be a cathode, and a second electrode may be an anode; or a first electrode may be an anode, and a second electrode may be a cathode.

The lithium battery may be prepared as follows.

An anode may be prepared by using the anode preparation method, and a cathode may be prepared by using the cathode preparation method.

A separator to be disposed between the cathode and the anode is prepared. The separator for the lithium battery may be any suitable separator used in lithium batteries. In some embodiments, the separator may have a low resistance to the migration of ions in an electrolyte and have an excellent electrolyte-retaining ability. Examples of the separator are glass fiber, polyester, polyethylene, polypropylene, PTFE (also known as TEFLON), and a combination thereof, each of which may be a non-woven or woven fabric. For example, a rollable separator including polyethylene or polypropylene may be used for a lithium ion battery. A separator with a desirable organic electrolytic solution-retaining ability may be used for a lithium ion polymer battery. For example, the separator may be manufactured in the following manner.

In some embodiments, a polymer resin, a filler, and a solvent may be combined, for instance mixed together, to prepare a separator composition. Then, the separator composition may be coated, for instance directly coated, on an electrode, and then dried to form the separator. In some embodiments, the separator composition may be cast on a support and then dried to form a separator film, which may then be separated from the support and laminated on an electrode to form the separator.

The polymer resin used to manufacture the separator may be any suitable material used as a binder for electrode plates. Examples of the polymer resin are a vinylidene fluoride/hexafluoropropylene copolymer, a polyvinylidene fluoride (PVDF), polyacrylonitrile, polymethylmethacrylate, and a combination thereof.

An electrolyte may be prepared as follows.

In some embodiments, the electrolyte may be an organic electrolyte solution. In some embodiments, the electrolyte may be in a solid phase. Examples of the electrolyte are boron oxide and lithium oxynitride. Any suitable material available as a solid electrolyte, including those in the art, may be used. In some embodiments, the solid electrolyte may be formed on the anode by, for example, sputtering.

In some embodiments, the organic electrolyte solution may be prepared by dissolving a lithium salt in an organic solvent.

The organic solvent may be any suitable solvent available as an organic solvent, including those in the art. In some embodiments, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, or a combination thereof.

In some embodiments, the lithium salt may be any suitable material available as a lithium salt, including those in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a combination thereof.

Figure 6:
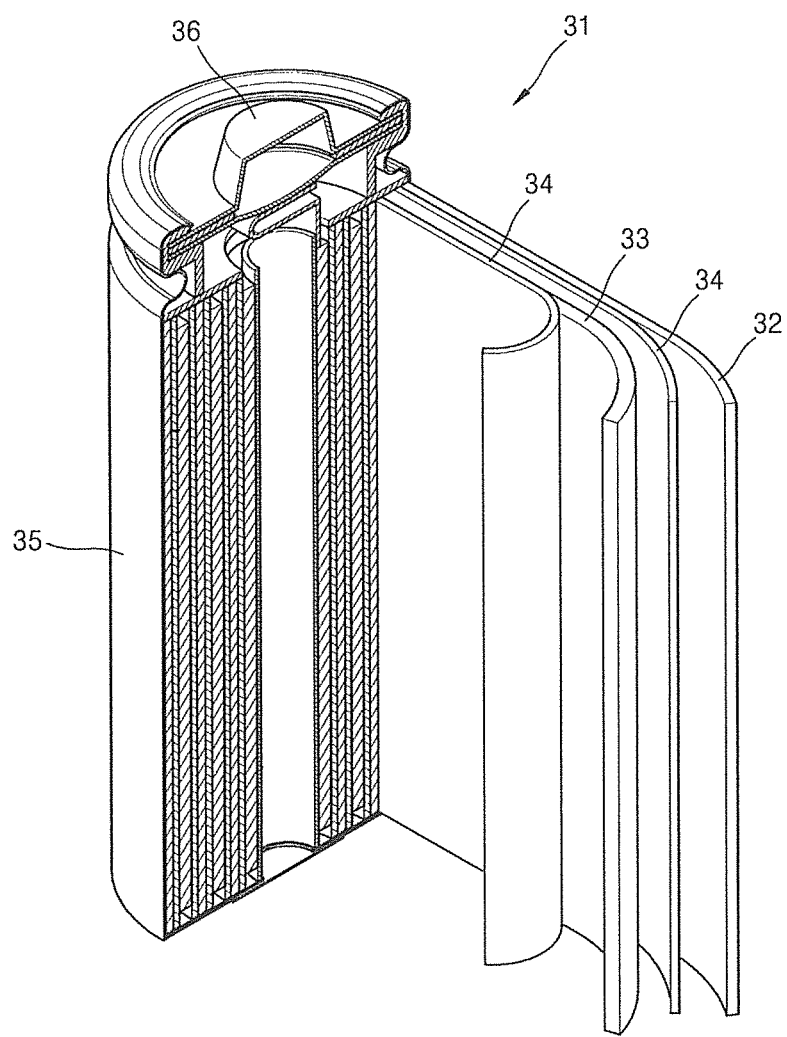
FIG. 6 shows a schematic view of a lithium battery according to an embodiment.

Referring to FIG. 6, a lithium battery 31 includes a cathode 33, an anode 32, and a separator 34. In some embodiments, the cathode 33, the anode 32, and the separator 34 may be wound or folded, and then sealed in a battery case 35. In some embodiments, the battery case 35 may be filled with an organic electrolytic solution and sealed with a cap assembly 36, thereby completing the manufacture of the lithium battery 31. In some embodiments, the battery case 35 may be a cylindrical type, a rectangular type, or a thin-film type. For example, the lithium battery 31 may be a thin-film type battery. In some embodiments, the lithium battery 31 may be a lithium ion battery.

In some embodiments, the separator may be disposed between the cathode and the anode to form a battery assembly. In some embodiments, the battery assembly may be stacked in a bi-cell structure and impregnated with the electrolytic solution. In some embodiments, the resultant assembly may be inserted into a pouch and hermetically sealed, thereby completing the manufacture of a lithium ion polymer battery.

In some embodiments, a plurality of battery assemblies may be stacked to form a battery pack, which may be used in any device that requires high capacity and high output, for example, in a laptop computer, a smart phone, or an electric vehicle.

The lithium battery may have improved lifetime characteristics and high-rate characteristics, and thus may be used in an electric vehicle (EV), for example, in a hybrid vehicle such as a plug-in hybrid electric vehicle (PHEV).

According to another embodiment, a method of preparing a binder includes preparing a third composition by combining, for instance mixing, a first composition including a non-aqueous solvent and a first polymer that has a first functional group and is selected from at least one of a polyamic acid and a polyimide, a second composition including a second polymer that has a second functional group and is aqueous, and water; and then heat-treating (heating) the third composition at a temperature of about 160° C. or greater to prepare a third polymer.

The first polymer, the second polymer, and the third polymer are the same as those defined in relation to the binder described above. A non-aqueous solvent included in the first composition may be a polar solvent such as N-methylpyrrolidone (NMP) or an alcohol. The first composition may further include water. The second composition may further include a polar organic solvent such as an alcohol mixed with water in addition to an aqueous solution including water. Therefore, the first composition and the second composition may be suitably mixed. Although a period of time for heat-treating the third composition at a temperature of about 160° C. or greater is not limited, the third composition, for example, may be heat-treated at a temperature of about 160° C. or greater for about 1 hour to about 10 hours. For example, the third composition may be heat-treated at a temperature of about 160° C. or greater for about 1 hour to about 5 hours. For example, the third composition may be heat-treated at a temperature of about 160° C. or greater for about 1 hour to about 3 hours. When the period of time for heat-treating the third composition is too short, cross-linking may not be sufficient, and when the period of time for heat-treating the third composition is too long, a degree of cross-linking compared to the heat-treating time may be insignificant. The heat-treating temperature may be lowered to about 120° C. when a cross-linking catalyst such as an acid is added, and when a separate cross-linking agent is added, the heat-treating temperature may be further lowered to about 120° C. or less. However, when the heat-treating temperature is too low, the polyamic acid may not be hardened to produce the polyimide.

In the method of preparing the binder, the third composition may be an electrode active material composition that further includes an electrode active material including a cathode active material or an anode active material. Thus, when the electrode active material composition is heat-treated at a temperature of about 160° C. or greater for 1 hour to 10 hours, the electrode may be prepared at the same time. In this case, the cross-linked binder may be homogenously bound to the electrode active material. For example, the cross-linked polymer binder may be homogeneously distributed in the anode and may be strongly attached to a metallic anode active material, and thus a volume change of the anode may be effectively reduced, for example suppressed.

In the method of preparing a binder, the first polymer may include an alkali metal. The first polymer may be substituted or doped with an alkali metal. The first polymer that is substituted or doped with an alkali metal may be referred to in the description of the binder above.

As used herein, a substituent may be derived by substitution of at least one hydrogen atom in a group with another atom or a functional group. Unless stated otherwise, a substituted functional group refers to a functional group substituted with at least one substituent selected from a C1-C40 alkyl group, a C2-C40 alkenyl group, a C3-C40 cycloalkyl group, a C3-C40 cycloalkenyl group, a C6-C40 aryl group, a C7-C40 alkylaryl group, and a C7-C40 arylalkyl group. When a functional group is "optionally" substituted, the functional group may be substituted with such a substituent listed above.

As used herein, in the expressions regarding the number of carbon atoms, i.e., a capital "C" followed by a number, for example, "C1-C20", "C3-C20", or the like, a number such as "1", "3", or "20" following "C" indicates the number of carbon atoms in a particular functional group. That is, a functional group may include 1 to 20 carbon atoms, exclusive of any substitutions. For example, a "C1-C4 alkyl group" refers to an alkyl group having 1 to 4 carbon atoms, such as $CH_3-$, $CH_3CH_2-$, $CH_3CH_2CH_2-$, $(CH_3)_2CH-$, $CH_3CH_2CH_2CH_2-$, $CH_3CH_2CH(CH_3)-$, and $(CH_3)_3C-$, where the alkyl group may be substituted or not.

As used herein, a particular radical may refer to a monovalent radical or a divalent radical depending on the context. For example, when a substituent needs two binding sites for binding with the rest of the molecule, the substituent may be understood as a divalent radical. For example, a substituent specified as an alkyl group that needs two binding sites may be a divalent radical, such as $-CH_2-$, $-CH_2CH_2-$, or $-CH_2CH(CH_3)CH_2-$. The term "alkylene" clearly indicates that the radical means a di-radical.

As used herein, the term "alkyl group" or "alkylene group" refers to a branched or unbranched aliphatic hydrocarbon group. For example, the alkyl group may or may not be substituted. Non-limiting examples of the alkyl group are a methyl group, an ethyl group, an n-propyl group, an isopropyl group, an n-butyl group, an isobutyl group, a tert-butyl group, a pentyl group, a hexyl group, each of which may be optionally substituted, i.e., substituted or not. In some embodiments, the alkyl group may have 1 to 6 carbon atoms. For example, a C1-C6 alkyl group may be a methyl group, an ethyl group, an n-propyl group, an isopropyl group, an n-butyl group, an iso-butyl group, a sec-butyl group, an n-pentyl group, a 3-pentyl group, or a hexyl group, but is not limited thereto.

As used herein, the term "alkenyl group" refers to a branched or unbranched hydrocarbon group including 2 to 20 carbon atoms with at least one carbon-carbon double bond. Non-limiting examples of the alkenyl group are an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexenyl group, and a cycloheptenyl group. These alkenyl groups may be substituted or not. For example, an alkenyl group may have 2 to 40 carbon atoms.

As used herein, the term "alkynyl group" refers to a branched or unbranched hydrocarbon group including 2 to 20 carbon atoms with at least one carbon-carbon triple bond. Non-limiting examples of the alkynyl group are an ethynyl group, a 1-propynyl group, a 1-butynyl group, and a 2-butynyl group. These alkynyl groups may be substituted or not. For example, an alkynyl group may have 2 to 40 carbon atoms.

As used herein, the term "cycloalkyl group" refers to a carbocyclic ring or ring system that is fully saturated. For example, the "cycloalkyl group" may refer to a cyclopropyl group, a cyclobutyl group, a cyclopentyl group, or a cyclohexyl group.

As used herein, the term "aromatic" refers to a ring or ring system with a conjugated π electron system, and may refer to a carbocyclic aromatic group (for example, a phenyl group) and a heterocyclic aromatic group (for example, a pyridine group). For example, an aromatic ring system as a whole may include a single ring or a fused polycyclic ring (i.e., a ring that shares adjacent atom pairs).

As used herein, the term "aryl group" refers to an aromatic group of at least one ring including only carbon atoms in its backbone, a ring system (i.e., a ring fused from at least two rings, which shares two or more adjacent carbon atoms), or a plurality of aromatic rings that are linked by a single bond, —O—, —S—, —C(=O)—, —S(=O)$_2$—, —Si(Ra)(Rb)— (where Ra and Rb are each independently a C1-C10 alkyl group), a C1-C10 alkylene group substituted or unsubstituted with a halogen, or —C(=O)—NH—. When the aryl group is a ring system, each ring in the ring system may be aromatic. Non-limiting examples of the aryl group are a phenyl group, a biphenyl group, a naphthyl group, a phenanthrenyl group, and a naphthacenyl group. These aryl groups may be substituted or not.

As used herein, the term "arylene group" refers to an aryl group that requires at least two linking sites, i.e., is at least divalent. A tetravalent arylene group is an aryl group that requires four linking sites, and a divalent arylene group is an aryl group that requires two linking sites. For example, the divalent arylene group may be —C$_6$H$_5$—O—C$_6$H$_5$—.

As used herein, the term "heteroaryl group" refers to an aromatic ring system with one ring, a plurality of rings that are fused to each other, or an aromatic ring system having a plurality of rings that are linked by a single bond, —O—, —S—, —C(=O)—, —S(=O)$_2$—, —Si(Ra)(Rb)— (where Ra and Rb are each independently a C1-C10 alkyl group), a C1-C10 alkylene group substituted or unsubstituted with a halogen, or —C(=O)—NH—, in which at least one member of the aromatic ring system is a heteroatom, i.e., not carbon. In the fused ring system, at least one heteroatom may be in one ring. For example, the heteroatom may be oxygen, sulfur, phosphorus, or nitrogen, but is not limited thereto. Non-limiting examples of the heteroaryl group are a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group.

As used herein, the term "heteroarylene group" refers to a heteroaryl group that requires at least two linking sites. A tetravalent heteroarylene group is a heteroaryl group that requires four linking sites, and a divalent heteroarylene group is a heteroaryl group that requires two linking sites.

As used herein, the term "aralkyl group" or "arylalkyl group" refers to an aryl group linked to a substituent via an alkylene group, such as a C7-C14 aralkyl group. Non-limiting examples of the aralkyl group or arylalkyl group are a benzyl group, a 2-phenylethyl group, a 3-phenylpropyl group, and a naphthylalkylene group. For example, the alkylene group may be a lower alkylene group (i.e., a C1-C4 alkylene group). As used herein, the term "alkaryl group" or "alkylaryl group" refers to an alkyl group linked to a substituent via an arylene group, such as a C7-C14 alkylaryl group. Non-limiting examples of the alkaryl group or "alkylaryl group are 4-methylphenylene.

As used herein, the terms "cycloalkenyl group" refers to a non-aromatic carbocyclic ring or ring system with at least one double bond without an aromatic ring. For example, the cycloalkenyl group may be a cyclohexenyl group.

As used herein, the terms "heterocyclic group" refers to a non-aromatic ring or ring system including at least one heteroatom in its cyclic backbone.

As used herein, the term "halogen" refers to a stable atom belonging to Group 17 of the periodic table of elements, for example, fluorine, chlorine, bromine, or iodine. For example, the halogen atom may be fluorine and/or chlorine.

Weight average molecular weights (Mw) of the first polymer, the second polymer, and the third polymer are measured by gel permeation chromatography (GPC) with respect to a standard sample.

Hereinafter, one or more embodiments will be described in detail with reference to the following examples. However, these examples are not intended to limit the scope of the one or more embodiments of the present specification.

EXAMPLES

Preparation of Cross-Linked Polymer

Example 1: LiPI:PVA=10:90

After filling a three-neck round-bottom flask with nitrogen, 9.9790 g (0.0498 mol) of 4,4'-oxydianiline (ODA) and 2.5275 g (0.0166 mol) of 1,3-diaminobenzoic acid (DABA) were added to the flask, 153 g of N-methylpyrrolidone (NMP) was added thereto, and the resultant was completely dissolved by using a mechanical stirrer. Then, 14.4935 g (0.0664 mol) of pyromellitic dianhydride (PMDA) was added thereto, and the mixture was stirred at room temperature for 24 hours to prepare a polyamic acid (PMDA/ODA/DABA, having an acid equivalent of 210 g/eq and an Mw of about 1,000,000 Da) represented by Formula 9. The polyamic acid was a random copolymer. A molar ratio of PMDA:ODA:DABA was 4:3:1. A molar ratio, n:m, in Formulae 9 and 10 was 3:1.

10 g of a LiOH aqueous solution at a 0.5 equivalent ratio with respect to carboxylic acid was added to the polyamic acid (PMDA/ODA/DABA, having an acid equivalent of 210 g/eq and an Mw of about 1,000,000 Da) represented by Formula 9 to prepare an aqueous polyamic acid represented by Formula 10 which had a 0.5 equivalent ratio of —C(=O)OH among the —C(=O)OH of the polyamic acid substituted with —C(=O)O$^-$Li$^+$. The aqueous polyamic acid represented by Formula 10 and a polyvinyl alcohol (having an Mw of 78,000 Da and a saponification degree of 88%, available from Polysciences, 15132) were mixed at a weight ratio of 10:90, and the mixture was heat-treated at 180° C. for 2 hours in a vacuum oven to perform a cross-linking reaction, and thus a cross-linked polymer was prepared. When an ester linker was formed by the reaction between a carboxyl group in the polyamic acid and a hydroxyl group of the polyvinyl alcohol, a cross-linked polymer of the polyamic acid and the polyvinyl alcohol was prepared. The cross-linked polymer had a 3-dimensional network structure as the polyamic acid and the polyvinyl alcohol cross-linked at a plurality of sites.

represented by Formula 10 and the polyvinyl alcohol were mixed at a weight ratio of 50:50.

Example 5: PI:PVA=10:90, Li-Unsubstituted

After filling a three-neck round-bottom flask with nitrogen, 9.9790 g (0.0498 mol) of 4,4'-oxydianiline (ODA) and 2.5275 g (0.0166 mol) of 1,3-diaminobenzoic acid (DABA) were added to the flask, 153 g of N-methylpyrrolidone (NMP) was added thereto, and the resultant was completely dissolved by using a mechanical stirrer. Then, 14.4935 g Formula 9

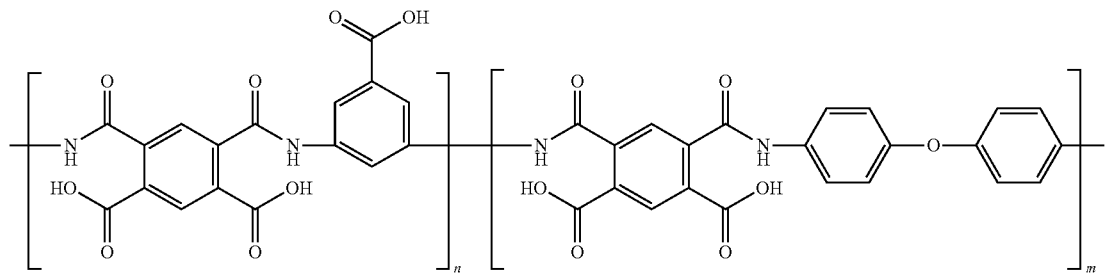

Formula 10

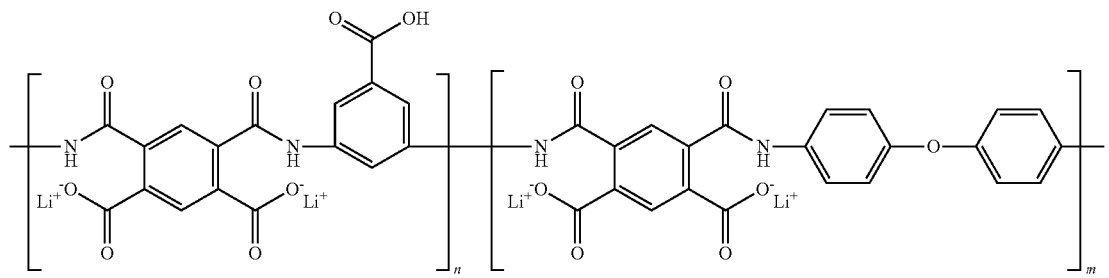

Example 2: LiPI:PVA=20:80

A cross-linked polymer was prepared in the same manner as in Example 1, except that the aqueous polyamic acid represented by Formula 10 and the polyvinyl alcohol were mixed at a weight ratio of 20:80.

Example 3: LiPI:PVA=30:70

A cross-linked polymer was prepared in the same manner as in Example 1, except that the aqueous polyamic acid represented by Formula 10 and the polyvinyl alcohol were mixed at a weight ratio of 30:70.

Example 4: LiPI:PVA=50:50

A cross-linked polymer was prepared in the same manner as in Example 1, except that the aqueous polyamic acid (0.0664 mol) of PMDA was added thereto, and the mixture was stirred at room temperature for 24 hours to prepare a polyamic acid (PMDA/ODA/DABA, having an acid equivalent of 210 g/eq and an Mw of about 1,000,000 Da) represented by Formula 9. The polyamic acid was a random copolymer. A molar ratio of PMDA:ODA:DABA was 4:3:1. A molar ratio, n:m, in Formulae 9 and 10 was 3:1.

The aqueous polyamic acid represented by Formula 9 and the polyvinyl alcohol (having an Mw of 78,000 Da and a saponification degree of 88%, available from Polysciences, 15132) were mixed at a weight ratio of 10:90, and the mixture was heat-treated at 180° C. for 2 hours in a vacuum oven to perform a cross-linking reaction, and thus a cross-linked polymer was prepared. When an ester linker was formed due to the reaction between a carboxyl group in the polyamic acid and a hydroxyl group of the polyvinyl alcohol, a cross-linked polymer of the polyamic acid and the polyvinyl alcohol was prepared.

Formula 9

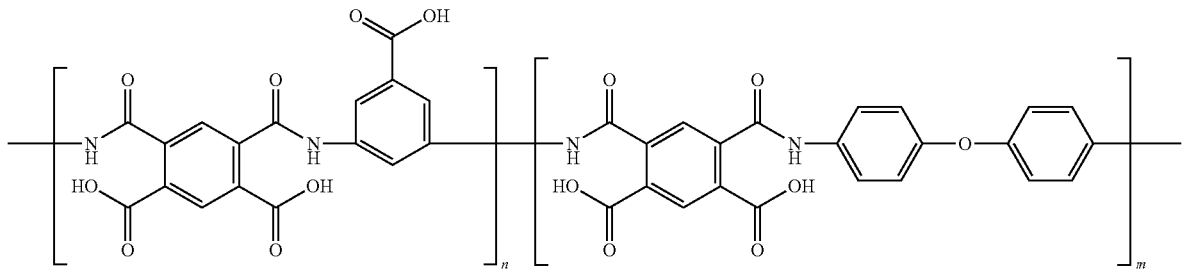

Comparative Example 1: LiPI:PVA=100:0

A lithium-substituted polyamic acid represented by Formula 10 and prepared in Example 1 was used as it was.

Comparative Example 2: LiPI:PVA=0:100

A polyvinyl alcohol used in Example 1 was used as it was.

Comparative Example 3: SBR/CMC

A mixture of styrene-butadiene (SBR) and carboxymethylcellulose (CMC) at a weight ratio of 1:1 was prepared.

Comparative Example 4: PI:PVA=20:80, Li-Unsubstituted, No Cross-Linker

After filling a three-neck round-bottom flask with nitrogen, 12.9230 g (0.0645 mol) of 4,4'-oxydianiline (ODA) was added to the flask, 153 g of N-methylpyrrolidone (NMP) was added thereto, and the resultant was completely dissolved by using a mechanical stirrer. Then, 14.0770 g (0.0645 mol) of PMDA was added thereto, and the mixture was stirred at room temperature for 24 hours to prepare a polyamic acid (PMDA/ODA, having an acid equivalent of 210 g/eq and an Mw of about 1,000,000 Da) represented by Formula 9a. A molar ratio of PMDA:ODA was 1:1. In Formula 9a, p is a polymerization degree which ranges from about 2,000 to about 10,000.

The polyamic acid represented by Formula 9a and the polyvinyl alcohol (having an Mw of 78,000 Da and a saponification degree of 88%, available from Polysciences, 15132) were mixed at a weight ratio of 20:80, and the mixture was heat-treated at 180° C. for 2 hours in a vacuum oven to prepare a polymer.

Formula 9a

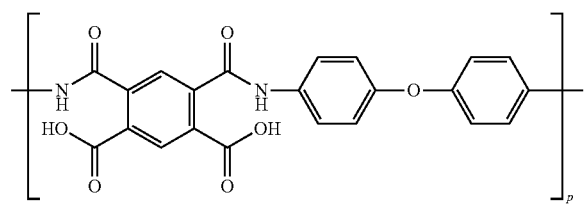

Preparation of Anode and Lithium Battery

Example 6

A Si—C composite (having an average particle diameter of 15 μm, available from Shin-Etsu) as an anode active material, artificial graphite as a conducting agent, and a mixture composition of lithium-substituted polyamic acid represented by Formula 10 and a polyvinyl alcohol at a weight ratio of 10:90 were mixed at a weight ratio of 25:67:8, and the mixture was mixed with NMP by using an agate mortar to prepare an anode active material slurry.

The anode active material slurry was coated on a copper foil current collector having a thickness of 10 micrometers (μm) to prepare an anode plate, and the completed anode plate with the coating was primarily dried in an oven at a temperature of 80° C. for 1 hour, secondarily dried in an oven at a temperature of 180° C. for 2 hours, and pressed by using a press to prepare an anode having a mixture density of 1.57 grams per cubic centimeter (g/cc) and a thickness of 660 μm.

The anode, a Li metal as a counter electrode, a polypropylene separator (Cellgard 3510) as a separator, and a solution including 1.3 M of $LiPF_6$ dissolved in a solvent mixture having ethylene carbonate (EC), fluoroethyl carbonate (FEC), and diethyl carbonate (DEC) (at a volume ratio of 2:2:6) as an electrolyte were used to prepare a CR-2032 coin half-cell.

Example 7

An anode and a lithium battery were prepared in the same manner as in Example 6, except that a composition mixture of the lithium-substituted polyamic acid and the polyvinyl alcohol mixed at a weight ratio of 20:80 as used in Example 2 was used.

Example 8

An anode and a lithium battery were prepared in the same manner as in Example 6, except that a composition mixture of the lithium-substituted polyamic acid and the polyvinyl alcohol mixed at a weight ratio of 30:70 as used in Example 3 was used.

Example 9

An anode and a lithium battery were prepared in the same manner as in Example 6, except that a composition mixture of the lithium-substituted polyamic acid and the polyvinyl alcohol mixed at a weight ratio of 50:50 as used in Example 4 was used.

Example 10

An anode and a lithium battery were prepared in the same manner as in Example 6, except that a composition mixture of the polyamic acid and the polyvinyl alcohol mixed at a weight ratio of 10:90 as used in Example 5 was used.

Comparative Example 5

An anode and a lithium battery were prepared in the same manner as in Example 6, except that the lithium-substituted polyamic acid prepared in Comparative Example 1 was used as a binder.

Comparative Example 6

An anode and a lithium battery were prepared in the same manner as in Example 6, except that the polyvinyl alcohol prepared in Comparative Example 2 was used as a binder.

Comparative Example 7

An anode and a lithium battery were prepared in the same manner as in Example 6, except that the SBR/CMC prepared in Comparative Example 3 was used as a binder.

Comparative Example 8

An anode and a lithium battery were prepared in the same manner as in Example 6, except that the polyimide represented by Formula 9a and the polyvinyl alcohol prepared in Comparative Example 4 were used as a binder.

Comparative Example 9

An anode and a lithium battery were prepared in the same manner as in Example 6, except that the lithium-substituted polyacrylamide (LiPAA) represented by the following formula was used as a binder.

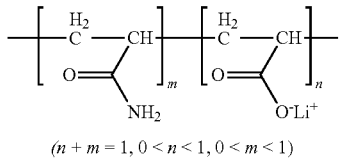

$(n + m = 1, 0 < n < 1, 0 < m < 1)$

Evaluation Example 1: IR Spectrum Analysis

Fourier Transform Infrared (IR) spectra of the polymers prepared in Examples 1 to 3 and Comparative Examples 1 and 2 were obtained to confirm whether or not cross-linking occurred in the polymers.

Figure 2:
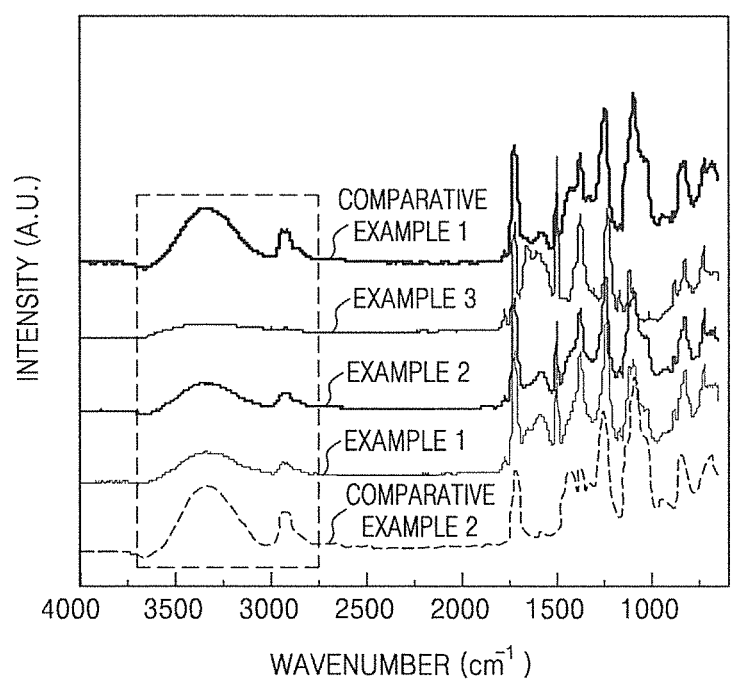
FIG. 2 is a graph of intensity (arbitrary units, a.u.) versus wavenumber (inverse centimeters, $cm^{-1}$) and shows IR spectra of polymers prepared in Examples 1 to 3 and Comparative Examples 1 and 2.

As shown in FIG. 2, a peak within 3700 to 2700 cm$^{-1}$ corresponding to a hydroxyl group was observed at a high intensity from the polymers prepared in Comparative Examples 1 and 2.

The cross-linked polymers of Examples 1 to 3 had a peak with a decreased intensity within 3700 to 2700 cm$^{-1}$ corresponding to a hydroxyl group due to formation of an ester bond by a cross-linking reaction, and thus it confirmed that cross-linking occurred during preparation of the polymers.

Evaluation Example 2: X-Ray Diffraction (XRD) Spectrum Analysis

XRD spectra of the polymers prepared in Examples 1 to 3 and Comparative Examples 1 and 2 were obtained to confirm whether or not cross-linking occurred in the polymers.

Figure 3:
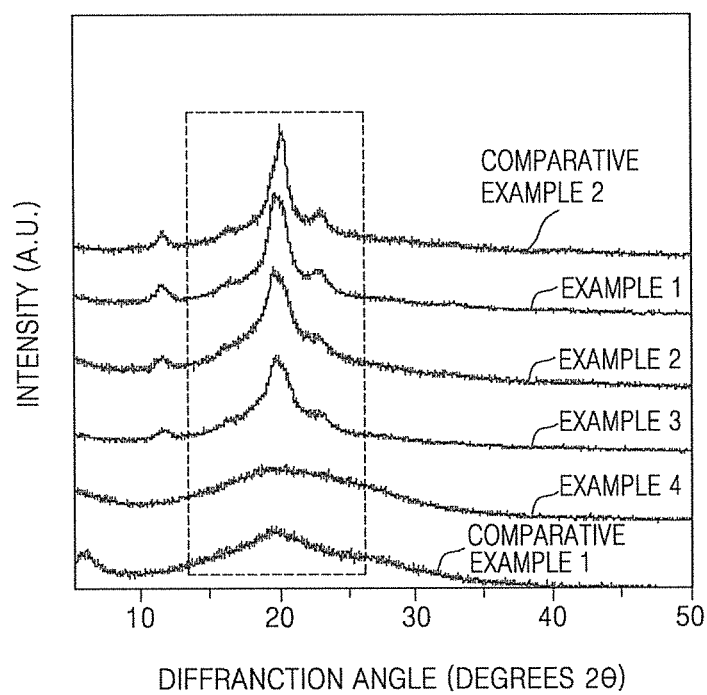
FIG. 3 is a graph of intensity (a.u.) versus diffraction angle (degrees 2-theta, 2θ) and shows X-ray diffraction (XRD) spectra of polymers prepared in Examples 1 to 4 and Comparative Examples 1 and 2.

As shown in FIG. 3, the polyvinyl alcohol of Comparative Example 2 exhibited high crystallinity, but when cross-linking of the polyimide and the polyvinyl alcohol increased in Examples 1 to 3, the crystallinity decreased.

Evaluation Example 3: Thermogravimetric Analysis (TGA)

The thermal stability of the polymers prepared in Examples 1 to 3 and Comparative Examples 1 and 2 was evaluated by TGA.

Figure 4:
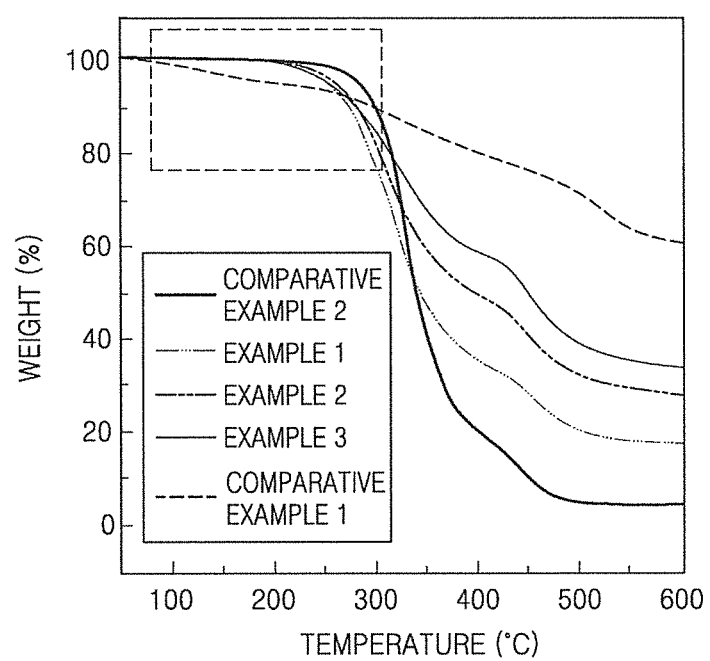
FIG. 4 is a graph of weight percent (%) versus temperature (° C.) and shows the DSC measurement results of polymers prepared in Examples 1 to 3 and Comparative Examples 1 and 2.

As shown in FIG. 4, the cross-linked polymers of Examples 1 to 3 and polyvinyl alcohol (PVA) of Comparative Example 2 had almost no change in their weights at a temperature of 200° C. or lower, and thus thermal stability of the cross-linked polymers improved compared to that of the polyimide (PI) of Comparative Example 1. Also, at a temperature of 300° C. or greater, a decrease in weight was suppressed in the cross-linked polymers of Examples 1 to 3 as compared with that which occurred in polyvinyl alcohol, and thus thermal stability of the cross-linked polymers of Examples 1 to 3 improved compared to that of polyvinyl alcohol.

Evaluation Example 4: Mechanical Physical Property Evaluation of Cross-Linked Polymer A polymer film having a size of 5×5 square centimeters (cm$^2$) and a thickness of 50 μm was prepared on a glass substrate by using one of the polymers prepared in Examples 1 to 4 and Comparative Examples 1 to 4 to evaluate mechanical physical properties of the polymers as follows.

Extension, recovery, modulus, and hardness of the polymers prepared in Examples 1 to 4 and Comparative Examples 1 to 4 were measured by using a microindenter (DUH-211, available from Shimadzu). A force applied on the polymer film sample was 10 milliNewtons (mN). The results of the measurement are shown in Table 1. An extension is a distance of a tip of the microindenter moved in a sample until a constant force was applied to the tip, and a recovery is a ratio of a distance of the tip moved from the deepest point in the sample to a point where the force applied to the tip was zero in a direction toward a surface of the sample with respect to the distance of the tip initially moved in the sample. The modulus is an indentation modulus and the hardness is an indentation hardness, and are calculated using a force applied to the tip from the sample according to a moving distance of the tip of the microindenter.

TABLE 1

|  | Extension [mm] | Recovery [%] | Modulus [GPa] | Hardness [N/mm$^2$] |
|---|---|---|---|---|
| Example 1 | 0.35 | 60.8 | 39.0 | 2399 |
| Example 2 | 0.32 | 70.7 | 45.0 | 2156 |

TABLE 1-continued

| | Extension [mm] | Recovery [%] | Modulus [GPa] | Hardness [N/mm$^2$] |
|---|---|---|---|---|
| Example 3 | 0.39 | 68.6 | 38.1 | 1578 |
| Example 4 | 0.35 | 72.5 | 31.0 | 1630 |
| Comparative Example 1 | 0.35 | 66.5 | 29.5 | 1624 |
| Comparative Example 2 | 0.33 | 66.5 | 29.5 | 1695 |
| Comparative Example 3 | 1.23 | 53.9 | 4.2 | 169 |
| Comparative Example 4 | 0.49 | 80.0 | 17.3 | 920 |

GPa: gigapascals

As shown in Table 1, since strengths of the binders increased as moduli, or elasticity moduli, of the cross-linked polymers of Examples 1 to 4 increased compared to those of the polymers of Comparative Examples 1 to 4, expansion of the electrodes was suppressed.

Moduli of the cross-linked polymers of Examples 1 to 4 improved compared to a binder prepared by using polyamic acid or polyvinyl alcohol alone. Such an improvement in physical properties was deemed as caused by the formation of a cross-linked polymer.

The rubber-based binder of Comparative Example 3 had a significantly low hardness and strength.

The polymer of Comparative Example 4 is a mixture of polyimide and polyvinyl alcohol, which was prepared without a cross-linking process, and thus the modulus and hardness of the polymer were significantly lower than those of the cross-linked polymers of Examples 1 to 4.

Evaluation Example 5: Mechanical Physical Property Evaluation of Non-Cross-Linked Polymer Polymers of Reference Example 1, Reference Example 2, Reference Example 3, and Reference Example 4 were prepared in the same manner as in Example 2 (LiPPA:PVA=20:80), Example 4 (LiPPA:PVA=50:50), Comparative Example 1 (LiPPA:PVA=100:0), and Comparative Example 2 (LiPPA:PVA=0:100), respectively, except that the heat-treating temperature was changed to 150° C., each polymer was used to prepare a polymer film having a size of 5×5 cm$^2$ and a thickness of 50 μm on a glass substrate, and the mechanical physical properties of each of the polymers were evaluated in the same manner as in Evaluation Example 4. The results are shown in Table 2.

TABLE 2

| | Extension [mm] | Modulus [GPa] |
|---|---|---|
| Reference Example 1 | 0.38 | 16.8 |
| Reference Example 2 | 0.37 | 16.4 |
| Reference Example 3 | 0.39 | 21.1 |
| Reference Example 4 | 0.38 | 18.5 |

As shown in Table 2, when polyamic acid and polyvinyl alcohol were mixed in the manner as the polymers mixed in Reference Examples 1 to 4, moduli of the polymers decreased, and thus it was confirmed that no cross-linking reaction occurred between the polyamic acid and the polyvinyl alcohol.

Evaluation Example 6: Electrode Plate Stability Evaluation

The lithium batteries (coin cells) prepared in Examples 7 and 9 and Comparative Examples 5, 6, and 7 were charged with a constant current at a rate of 0.1 C until a voltage of 0.01 V (vs. Li) was reached, and charged with a constant voltage until a constant current of 0.01 C was reached while maintaining the voltage at 0.01 V. Once the charging was completed, the lithium batteries were rested for about 10 minutes, and then the batteries were each discharged with a constant current of 0.1 C until a voltage of 1.5 V (vs. Li) was reached during a discharging process (1$^{st}$ cycle).

Subsequently, the batteries were each charged with a constant current at a rate of 0.2 C until a voltage of 0.01 V (vs. Li) was reached, and charged with a constant voltage until a constant current of 0.01 C was reached while maintaining the voltage at 0.01 V.

The charged coin cells were disassembled to evaluate stability of the electrode plate. The stability of the electrode plate was evaluated by confirming whether an initial shape of an electrode was maintained after the charging/discharging process as binding within the active material layer and between the active material layer and the current collector was maintained.

Figure 5:
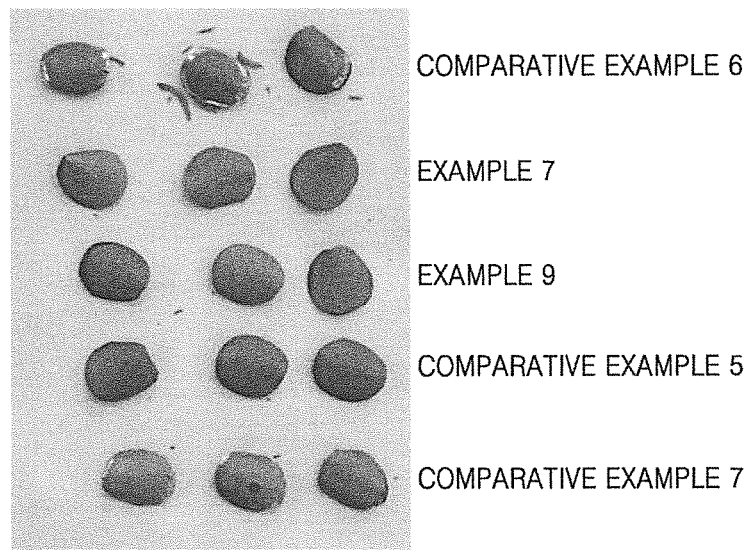
FIG. 5 shows an image of an anode that is dissociated after charging coin cell lithium batteries, prepared in Examples 7 and 9 and Comparative Examples 5 to 7, twice.

As shown in FIG. 5, cracks occurred in the anode of Comparative Example 6 prepared by using polyvinyl alcohol, and thus the active material layer was separated from the current collector. Also, the anode of Comparative Example 7 prepared using a binder of SBR-CMC had cracks which occurred therein.

The anode of Comparative Example 5 prepared using the polyimide and the anodes of Examples 7 and 9 prepared using the cross-linked polymers maintained the initial shapes of the anode plates without cracks.

Therefore, stability of the anode plates improved by using the binder of Examples 7 and 9. That is, the cross-linked polymer maintained both cohesion between the materials of the active material layer and cohesion between the active material layer and the current collector, thus preventing cracking of the electrode.

Also, polyvinyl alcohol was observed to generate cracks and thus may not be used alone as a binder in an electrode.

Evaluation Example 7: Charging/Discharging Characteristics Evaluation

At 25° C., the lithium batteries (coin cells) prepared in Examples 6 to 10 and Comparative Examples 5 to 9 were charged with a constant current at a rate of 0.1 C until a voltage of 0.01 V (vs. Li) was reached, and charged with a constant voltage until a constant current of 0.01 C was reached while maintaining the voltage at 0.01 V. Once the charging was completed, the lithium batteries were rested for about 10 minutes, and then the batteries were each discharged with a constant current of 0.1 C until a voltage of 1.5 V (vs. Li) was reached during a discharging process (1$^{st}$ cycle).

Subsequently, the batteries were each charged with a constant current at a rate of 0.2 C until a voltage of 0.01 V (vs. Li) was reached, and charged with a constant voltage until a constant current of 0.01 C was reached while maintaining the voltage at 0.01 V. Once the charging was completed, the lithium batteries were rested for about 10 minutes, and then the batteries were each discharged with a constant current of 0.2 C until a voltage of 1.5 V (vs. Li) was reached during a discharging process ($2^{nd}$ cycle) (a formation process includes the $1^{st}$ and $2^{nd}$ cycles).

At 25° C., the coin cells after the formation process were each charged with a constant current at a rate of 0.1 C until a voltage of 0.01 V (vs. Li) was reached, and charged with a constant voltage until a constant current of 0.01 C was reached while maintaining the voltage at 0.01 V. Once the charging was completed, the lithium batteries were rested for about 10 minutes, and then the batteries were each discharged with a constant current of 1.0 C until a voltage of 1.5 V (vs. Li) was reached during a discharging process. This cycle was repeated 50 times. The results of the charging/discharging test are shown in Table 3.

The electrode thickness expansion ratios, initial efficiencies, and capacity retention rates of the electrode were each calculated according to Equations 1 to 3, respectively. The electrode thickness expansion ratio relates to an anode electrode.

Electrode thickness expansion ratio (%)=[Electrode thickness of disassembled battery after $2^{nd}$ charging cycle/electrode thickness before battery assembly]×100.  Equation 1

Initial efficiency [%]=[Discharging capacity at $1^{st}$ cycle/Charging capacity at $1^{st}$ cycle]×100  Equation 2

Capacity retention ratio [%]=[Discharging capacity at $53^{rd}$ cycle/Discharging capacity at $3^{rd}$ cycle]×100  Equation 3

TABLE 3

| | Initial efficiency [%] | $1^{st}$ cycle discharge capacity [mAh/g] | Capacity retention ratio [%] | Electrode thickness expansion ratio [%] |
|---|---|---|---|---|
| Example 6 | 84.4 | 646 | 97.5 | 48 |
| Example 7 | 84.0 | 654 | 97.4 | 42 |
| Example 8 | 83.0 | 644 | 97.3 | 50 |
| Example 9 | 81.1 | 635 | 95.7 | 52 |
| Example 10 | 82.2 | 655 | 96.7 | 60 |
| Comparative Example 5 | 79.3 | 643 | 95.6 | 55 |
| Comparative Example 6 | 83.7 | 637 | 95.2 | 60 |
| Comparative Example 7 | 84.5 | 630 | 79.2 | 108 |
| Comparative Example 8 | 82.4 | 647 | 93.3 | 66 |
| Comparative Example 9 | 83.4 | 636 | 94.2 | 56 | mAh/g: milliampere hours per gram

As shown in Table 3, the lithium batteries of Examples 6 to 10 had improved lifespan characteristics compared to those of the lithium batteries of Comparative Examples 5 to 9. The lithium batteries of Examples 6 to 10 had improved initial efficiencies compared to those of the lithium battery of Comparative Example 5 including polyimide. The lithium batteries of Examples 6 to 10 had significantly decreased electrode thickness expansion ratios compared to those of the lithium batteries of Comparative Examples 7 to 8 including a binder.

As described above, according to one or more embodiments, the initial efficiency, lifespan characteristics, and electrode stability of a lithium battery may improve by using a binder including a cross-linked polymer, in which polyimide and an aqueous binder are cross-linked. Also, the volume change of the lithium battery may be suppressed.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. A binder comprising:
a third polymer comprising a cross-linked product of a first polymer and a second polymer,
wherein the first polymer comprises a first functional group and is at least one selected from a polyamic acid and a polyimide,
wherein the second polymer comprises a second functional group and is water-soluble, and
wherein the first polymer and the second polymer are cross-linked by an ester bond formed by a reaction of the first functional group and the second functional group,
wherein the polyamic acid is represented by Formula 1 or Formula 2:

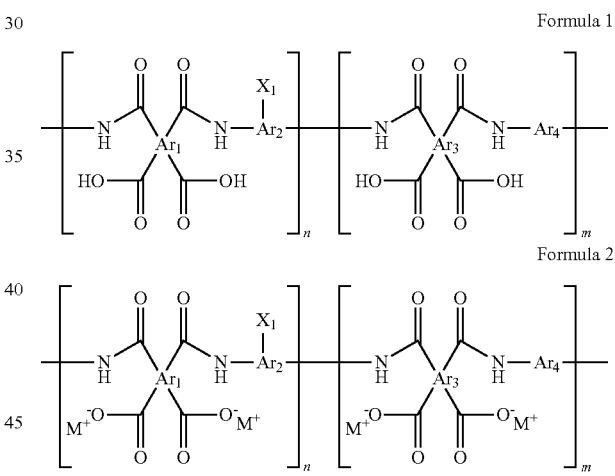

Formula 1

Formula 2 wherein, in Formulae 1 and 2,
M is an alkali metal;
$Ar_1$ and $Ar_3$ are each independently an aromatic group selected from a substituted or unsubstituted tetravalent C6-C24 arylene group and a substituted or unsubstituted tetravalent C4-C24 heteroarylene group, wherein the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si(Ra)(Rb)-, a C1-C10 alkylene group substituted or unsubstituted with a halogen, or —C(=O)—NH—, wherein Ra and Rb are each independently a substituted or unsubstituted C1-C10 alkyl group;
$Ar_2$ and $Ar_4$ are each independently an aromatic group selected from a substituted or unsubstituted divalent C6-C24 arylene group and a substituted or unsubstituted divalent C4-C24 heteroarylene group, wherein the aromatic group is one aromatic ring, a ring having at least two aromatic rings fused to each other, or a ring comprising at least two aromatic rings linked by a single bond, —O—, —S—, —C(=O)—, —S(=O)$_2$—, —Si(Ra)(Rb)-, a C1-C10 alkylene group substituted or unsubstituted with a halogen, or —C(=O)—NH—, wherein Ra and Rb are each independently a substituted or unsubstituted C1-C10 alkyl group;

$X_1$ is —C(=O)OH, —OH, —C(=O)—NH$_2$, or —C(=O)H; and n and m are each a molar ratio of a repeating unit, where 0<n<1, 0<m<1, and n+m=1.

2. The binder of claim 1, wherein the first functional group and the second functional group are each independently at least one selected from a carboxyl group, a hydroxyl group, an amide group, and an aldehyde group.

3. The binder of claim 1, wherein the first polymer further comprises an alkali metal.

4. The binder of claim 3, wherein an amount of the alkali metal in the first polymer is in a range of about 0.2 equivalents to about 1.0 equivalents at an equivalent ratio with respect to a carboxyl group or an amide group.

5. The binder of claim 1, wherein the polyamic acid is represented by Formula 3 or Formula 4:

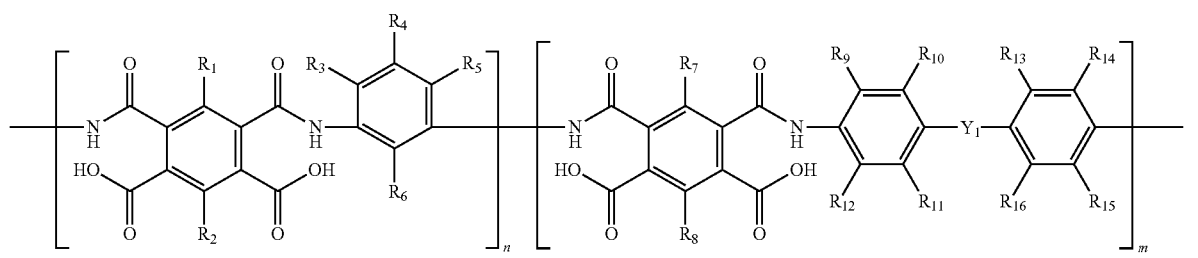

Formula 3

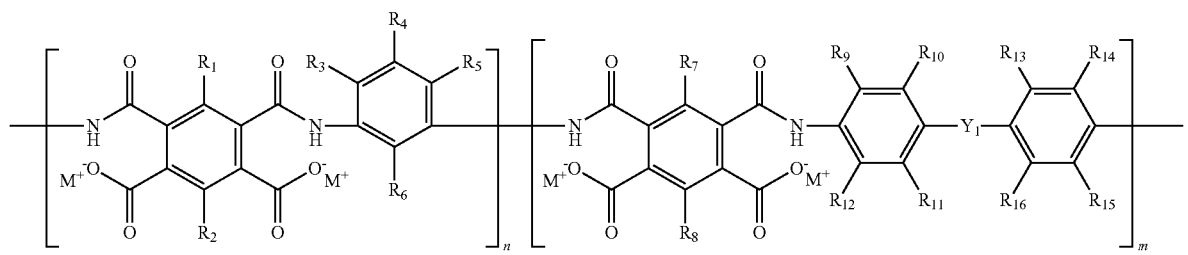

Formula 4 wherein, in Formulae 3 and 4,

M is lithium or sodium;

$R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ are each independently a hydrogen, a halogen, —C(=O)OH, —OH, —C(=O)—NH$_2$, —C(=O)H, a C1-C10 alkyl group substituted or unsubstituted with a halogen, a C6-C20 aryl group substituted or unsubstituted with a halogen, or a C2-C20 heteroaryl group substituted or unsubstituted with a halogen;

$Y_1$ is a single bond, —O—, —S—, —C(=O)—, —S(=O)$_2$—, —Si(Ra)(Rb)-, a C1-C10 alkylene group substituted or unsubstituted with a halogen, or —C(=O)—NH—, wherein where Ra and Rb are each independently a substituted or unsubstituted C1-C10 alkyl group, and R is a C1-C10 alkyl group;

at least one selected from $R_3$, $R_4$, $R_5$, and $R_6$ is —C(=O)OH, —OH, —C(=O)—NH$_2$, or —C(=O)H; and n and m are each a molar ratio of a repeating unit, where 0<n<1, 0<m<1, and n+m=1.

6. The binder of claim 1, wherein the polyimide is represented by Formula 5 or Formula 6:

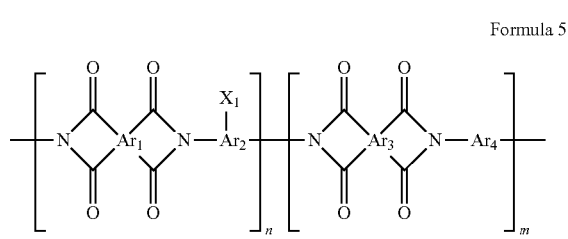

Formula 5

-continued

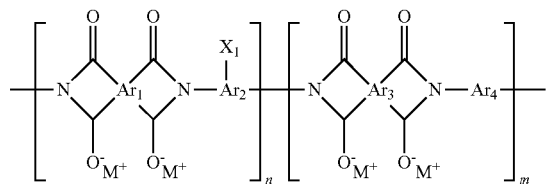

Formula 6 wherein, in Formulae 5 and 6,

M is an alkali metal;

Ar$_1$ and Ar$_2$ are each independently an aromatic group selected from a substituted or unsubstituted tetravalent C6-C24 arylene group and a substituted or unsubstituted tetravalent C4-C24 heteroarylene group, wherein the aromatic group is one aromatic ring, a group comprising at least two aromatic rings fused to each other, or a ring comprising at least two aromatic rings linked by a single bond, —O—, —S—, —C(=O)—, —S(=O)$_2$—, —Si(Ra)(Rb)-, a C1-C10 alkylene group substituted or unsubstituted with a halogen, or —C(=O)—NH—, where Ra and Rb are each independently a substituted or unsubstituted C1-C10 alkyl group;

Ar$_2$ and Ar$_4$ are each independently an aromatic group selected from a substituted or unsubstituted divalent C6-C24 arylene group and a substituted or unsubstituted divalent C4-C24 heteroarylene group, wherein the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si(Ra)(Rb)-, a C1-C10 alkylene group substituted or unsubstituted with a halogen, or —C(=O)—NH—, where Ra and Rb are each independently a substituted or unsubstituted C1-C10 alkyl group;

X$_1$ is —C(=O)OH, —OH, —C(=O)—NH$_2$, or —C(=O)H; and n and m are each a molar ratio of a repeating unit, where 0<n<1, 0<m<1, and n+m=1.

7. The binder of claim 1, wherein the polyimide is represented by Formula 7 or Formula 8:

wherein, in Formulae 7 and 8,

M is lithium or sodium;

R$_1$, R$_2$, R$_3$, R$_4$, R$_5$, R$_6$, R$_7$, R$_8$, R$_9$, R$_{10}$, R$_{11}$, R$_{12}$, R$_{13}$, R$_{14}$, R$_{15}$, and R$_{16}$ are each independently a hydrogen, a halogen, —C(=O)OH, —OH, —C(=O)—NH$_2$, —C(=O)H, a C1-C10 alkyl group substituted or unsubstituted with a halogen, a C6-C20 aryl group substituted or unsubstituted with a halogen, or a C2-C20 heteroaryl group substituted or unsubstituted with a halogen;

Y$_1$ is a single bond, —O—, —S—, —C(=O)—, —S(=O)$_2$—, —Si(Ra)(Rb)-, a C1-C10 alkylene group substituted or unsubstituted with a halogen, or —C(=O)—NH—, where Ra and Rb are each independently a substituted or unsubstituted C1-C10 alkyl group;

at least one selected from R$_3$, R$_4$, R$_5$, and R$_6$ is —C(=O)OH, —OH, —C(=O)—NH$_2$, or —C(=O)H; and n and m are each a molar ratio of a repeating unit, where 0<n<1, 0<m<1, and n+m=1.

8. The binder of claim 1, wherein the polyamic acid is represented by Formula 9 or Formula 10, and the polyimide is represented by Formula 11 or Formula 12:

Formula 7

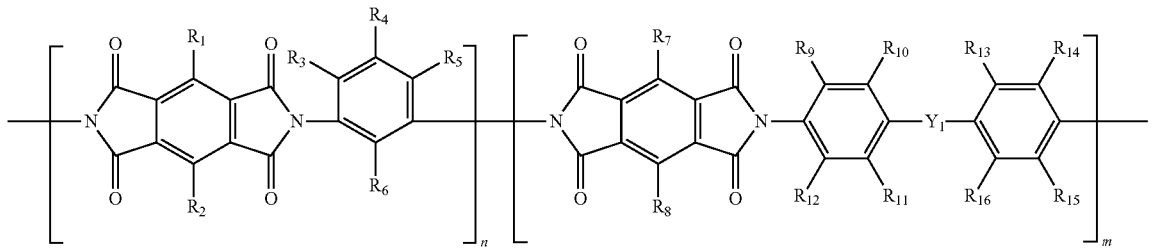

Formula 8

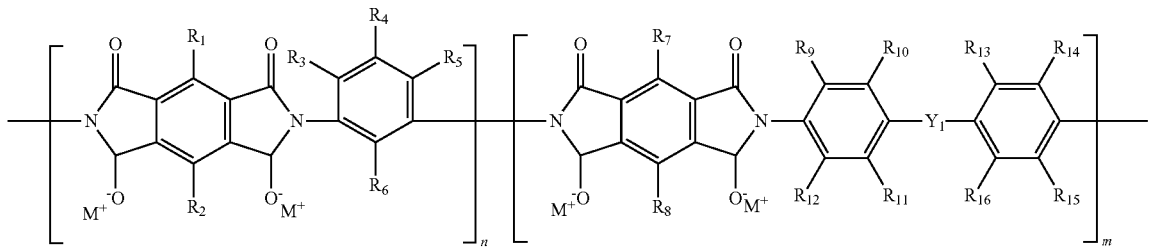

Formula 9

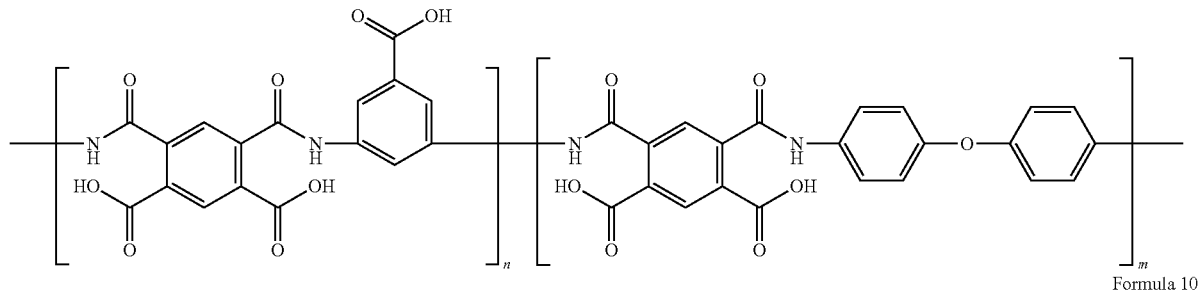

Formula 10

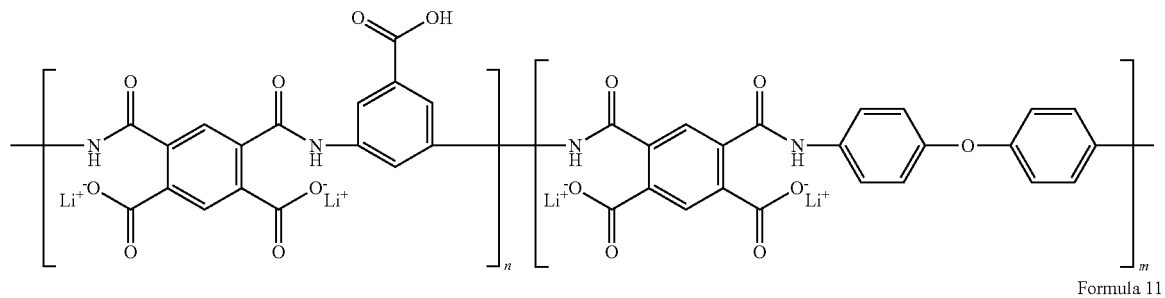

Formula 11

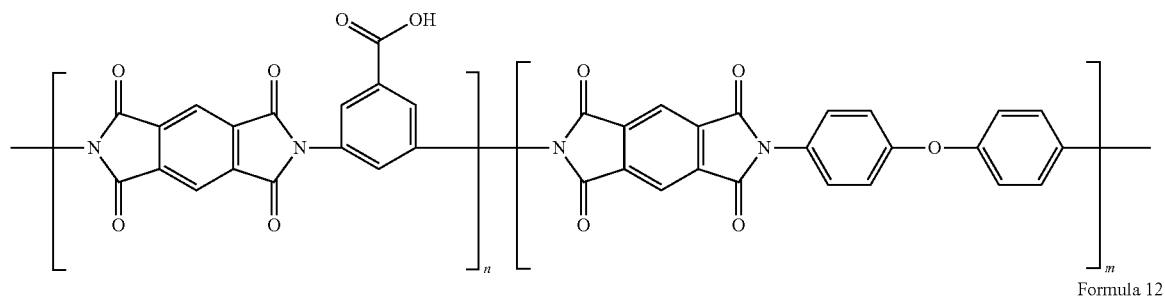

Formula 12

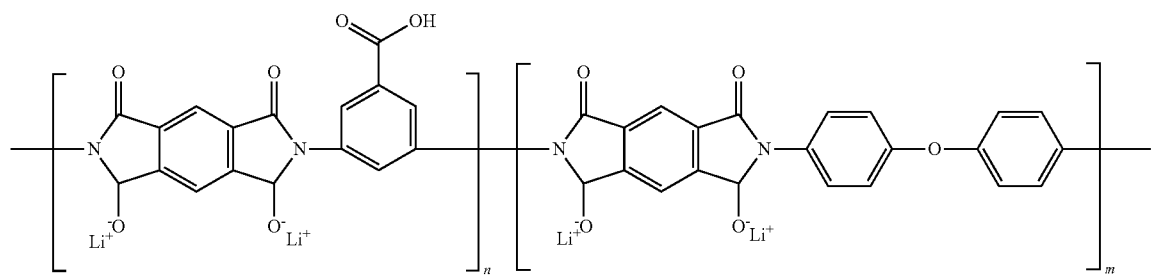

wherein, in Formulae 9 to 12, n and m are each a molar ratio of a repeating unit, where 0<n<1, 0<m<1, and n+m=1.

9. The binder of claim 8, wherein 0<n<0.5, 0.5<m<1, and n+m=1.

10. The binder of claim 1, wherein the second polymer is a polymerization reaction product or its hydrolysate of at least one monomer selected from a vinyl monomer, an acetate monomer, an alcohol monomer, a (meth)acryl monomer, an acrylamide monomer, and a methacrylamide monomer.

11. The binder of claim 1, wherein the second polymer is a polymerization reaction product or its hydrolysate of at least one monomer selected from vinyl acetate, vinyl alcohol, butyl (meth)acrylate, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, 2-hydroxypropyleneglycol (meth)acrylate, acrylic acid, methacrylic acid, 2-(meth)acryloyloxy acetic acid, 3-(meth)acryloyloxy propyl acid, 4-(meth)acryloyloxy butyric acid, itaconic acid, maleic acid, 2-isocyanatoethyl (meth)acrylate, 3-isocyanatopropyl (meth)acrylate, 4-isocyanatobutyl (meth)acrylate, (meth)acrylamide, ethylene di(meth)acrylate, diethyleneglycol (meth)acrylate, triethyleneglycol di(meth)acrylate, trimethylenepropane tri(meth)acrylate, trimethylenepropane triacrylate, 1,3-butanediol (meth)acrylate, 1,6-hexanediol di(meth)acrylate, allyl acrylate, and N-vinyl caprolactam.

12. The binder of claim 1, wherein the second polymer is a polyvinyl alcohol.

13. The binder of claim 12, wherein a saponification degree of the polyvinyl alcohol is in a range of about 60% to about 99%.

14. The binder of claim 12, wherein a weight average molecular weight of the polyvinyl alcohol is in a range of about 10,000 Daltons to about 500,000 Daltons.

15. The binder of claim 1, wherein a weight ratio of the first polymer and the second polymer is in a range of about 1:99 to about 50:50.

16. The binder of claim 1, wherein the cross-linking is at a temperature of about 160° C. or greater.

17. The binder of claim 1, wherein an indentation modulus of the third polymer is greater than each of a modulus of the first polymer and a modulus of the second polymer.

18. The binder of claim 1, wherein an indentation hardness of the third polymer is greater than each of an indentation hardness of the first polymer and an indentation hardness of the second polymer.

19. The binder of claim 1, wherein the third polymer has a network structure comprising the cross-linked product of the first polymer and the second polymer.

20. The binder of claim 1, wherein a weight average molecular weight of the third polymer is in a range of about 10,000 Daltons to about 1,000,000 Daltons.

21. The binder of claim 1, wherein the third polymer is represented by one of Formulae 13 to 16:

Formula 13

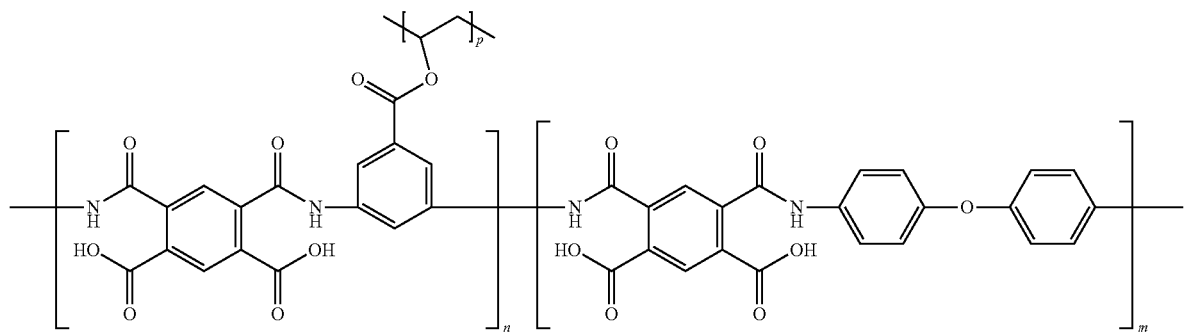

Formula 14

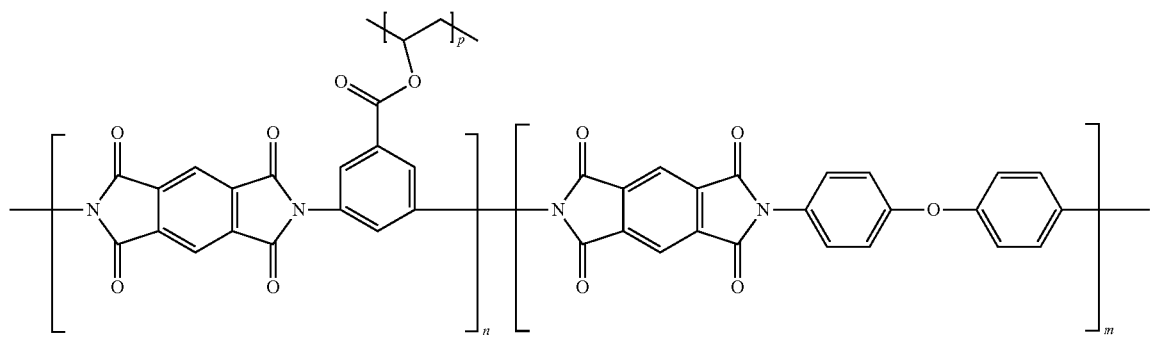

Formula 15

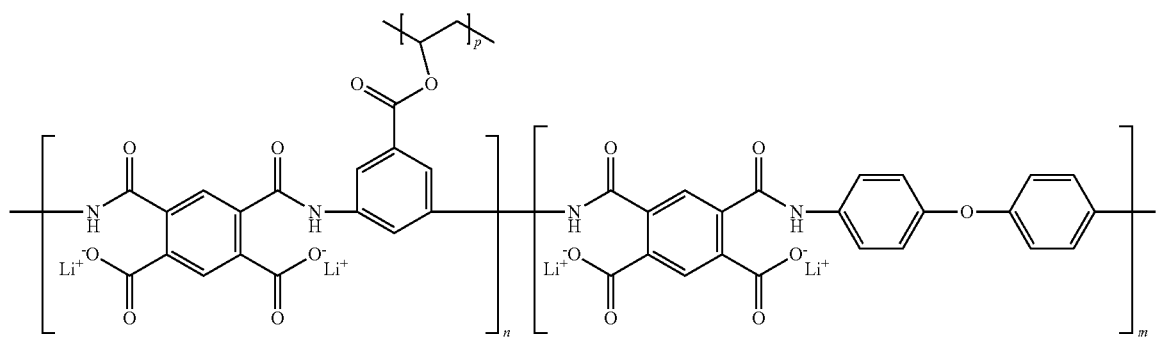

Formula 16

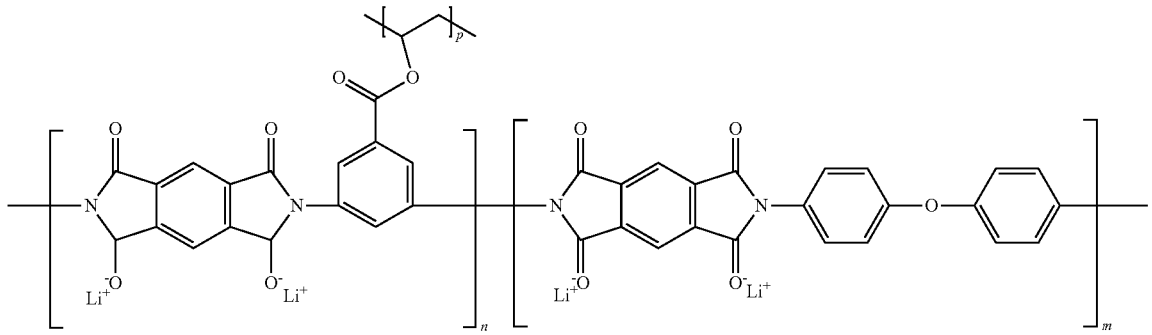

wherein, in Formulae 13 to 16,
n and m are each a molar ratio of a repeating unit, where $0<n<1$, $0<m<1$, and $n+m=1$; and
p is a polymerization degree which is in a range of about 250 to about 12,500.

22. The binder of claim 1, further comprising a fourth polymer selected from hydroxyethyl cellulose ether, dextran, carboxymethylcellulose, alginate, cellulose nanofiber, xanthan gum, and guar gum.

23. A method of preparing a binder according to claim 1, the method comprising
preparing a third composition by mixing together a first composition comprising a non-aqueous solvent and a first polymer and a second composition comprising a second polymer and water,
wherein the first polymer comprises a first functional group and is selected from at least one of a polyamic acid and a polyimide, and
the second polymer comprises a second functional group and is water-soluble; and
heating the third composition at a temperature of about 160° C. or greater to prepare a third polymer.

24. The method of claim 23, wherein the first polymer further comprises an alkali metal.

25. A binder comprising a cross-linked product of a first polymer and second polymer, wherein the first polymer is at least one of a polyamic acid or a polyimide, each of which comprises an alkali metal and a first functional group, and the second polymer comprises a second functional group and is water-soluble,
wherein the first polymer and the second polymer are cross-linked by an ester bond formed by a reaction of the first functional group and the second functional group, and
the cross-linked product comprises a weight ratio of the first polymer to the second polymer in a range of about 1:99 to about 50:50.

26. The binder of claim 25, wherein the second polymer is a polymerization reaction product or its hydrolysate of at least one monomer selected from vinyl acetate, vinyl alcohol, butyl (meth)acrylate, 2-hydroxyethyl (meth)acrylate, 2-hydroxypropyl (meth)acrylate, 4-hydroxybutyl (meth) acrylate, 6-hydroxyhexyl (meth)acrylate, 8-hydroxyoctyl (meth)acrylate, 2-hydroxyethyleneglycol (meth)acrylate, 2-hydroxypropyleneglycol (meth)acrylate, acrylic acid, methacrylic acid, 2-(meth)acryloyloxy acetic acid, 3-(meth) acryloyloxy propyl acid, 4-(meth)acryloyloxy butyric acid, itaconic acid, maleic acid, 2-isocyanatoethyl (meth)acrylate, 3-isocyanatopropyl (meth)acrylate, 4-isocyanatobutyl (meth)acrylate, (meth)acrylamide, ethylene di(meth)acrylate, diethyleneglycol (meth)acrylate, triethyleneglycol di(meth)acrylate, trimethylenepropane tri(meth)acrylate, trimethylenepropane triacrylate, 1,3-butanediol (meth)acrylate, 1,6-hexanediol di(meth)acrylate, allyl acrylate, or N-vinyl caprolactam.

27. The binder of claim 25, wherein the polyamic acid is represented by Formula 2

Formula 2

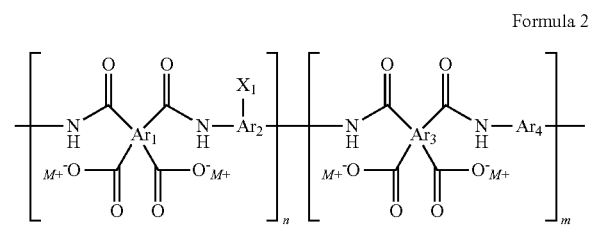

wherein, in Formula 2,
M is an alkali metal;
$Ar_1$ and $Ar_3$ are independently an aromatic group selected from a substituted or unsubstituted tetravalent C6-C24 arylene group and a substituted or unsubstituted tetravalent C4-C24 heteroarylene group, wherein the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si(Ra)(Rb)-, a C1-C10 alkylene group substituted or unsubstituted with a halogen, or —C(=O)—NH—, wherein Ra and Rb are each independently a substituted or unsubstituted C1-C10 alkyl group;
$Ar_2$ and $Ar_4$ are independently an aromatic group selected from a substituted or unsubstituted divalent C6-C24 arylene group and a substituted or unsubstituted divalent C4-C24 heteroarylene group, wherein the aromatic group is one aromatic ring, a ring having at least two aromatic rings fused to each other, or a ring comprising at least two aromatic rings linked by a single bond, —O—, —S—, —C(=O)—, —S(=O)$_2$—, —Si(Ra) (Rb)-, a C1-C10 alkylene group substituted or unsubstituted with a halogen, or —C(=O)—NH—, wherein Ra and Rb are each independently a substituted or unsubstituted C1-C10 alkyl group;
$X_1$ is —C(=O)OH, —OH, —C(=O)—NH$_2$, or —C(=O)H; and
n and m are each a molar ratio of a repeating unit, where $0<n<1$, $0<m<1$, and $n+m=1$; and the polyimide is represented by Formula 6:

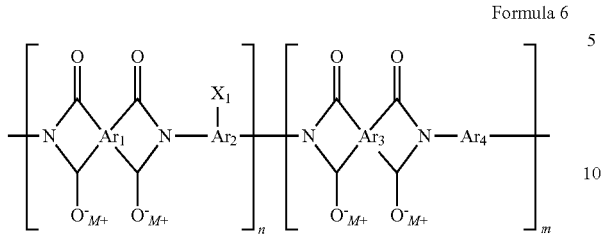

Formula 6 wherein, in Formula 6,

M is an alkali metal;

Ar$_1$ and Ar$_3$ are each independently an aromatic group selected from a substituted or unsubstituted tetravalent C6-C24 arylene group and a substituted or unsubstituted tetravalent C4-C24 heteroarylene group, wherein the aromatic group is one aromatic ring, a group comprising at least two aromatic rings fused to each other, or a ring comprising at least two aromatic rings linked by a single bond, —O—, —S—, —C(=O)—, —S(=O)$_2$—, —Si(Ra)(Rb)-, a C1-C10 alkylene group substituted or unsubstituted with a halogen, or —C(=O)—NH—, where Ra and Rb are each independently a substituted or unsubstituted C1-C10 alkyl group;

Ar$_2$ and Ar$_4$ are each independently an aromatic group selected from a substituted or unsubstituted divalent C6-C24 arylene group and a substituted or unsubstituted divalent C4-C24 heteroarylene group, wherein the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si(Ra)(Rb)-, a C1-C10 alkylene group substituted or unsubstituted with a halogen, or —C(=O)—NH—, where Ra and Rb are each independently a substituted or unsubstituted C1-C10 alkyl group;

X$_1$ is —C(=O)OH, —OH, —C(=O)—NH$_2$, or —C(=O)H; and n and m are each a molar ratio of a repeating unit, where 0<n<1, 0<m<1, and n+m=1.

* * * * *